US009794370B2

(12) United States Patent
Abbasi et al.

(10) Patent No.: US 9,794,370 B2
(45) Date of Patent: Oct. 17, 2017

(54) SYSTEMS AND METHODS FOR DISTRIBUTED NETWORK-AWARE SERVICE PLACEMENT

(71) Applicant: Telefonaktiebolaget L M Ericsson (publ), Stockholm (SE)

(72) Inventors: Zahra Abbasi, Cupertino, CA (US); Yağiz Onat Yazir, San Jose, CA (US); Joacim Halén, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 178 days.

(21) Appl. No.: 14/936,469

(22) Filed: Nov. 9, 2015

(65) Prior Publication Data

US 2017/0134520 A1    May 11, 2017

(51) Int. Cl.
*G06F 15/173* (2006.01)
*H04L 29/08* (2006.01)
(Continued)

(52) U.S. Cl.
CPC ............ *H04L 67/32* (2013.01); *G06F 9/5066* (2013.01); *H04L 47/70* (2013.01); *H04L 67/10* (2013.01)

(58) Field of Classification Search
CPC ......... H04L 67/32; H04L 67/10; H04L 47/70; G06F 9/5066
See application file for complete search history.

(56) References Cited

U.S. PATENT DOCUMENTS

| 6,381,735 B1 * | 4/2002 | Hunt | G06F 8/443 |
|  |  |  | 714/E11.209 |
| 6,983,463 B1 * | 1/2006 | Hunt | G06F 9/5066 |
|  |  |  | 709/201 |

(Continued)

OTHER PUBLICATIONS

IEEE 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

(Continued)

*Primary Examiner* — Jonathan Bui
(74) *Attorney, Agent, or Firm* — Nicholson De Vos Webster & Elliott, LLP

(57) ABSTRACT

Exemplary methods for distributed multi-component network-aware service placement in a resource pool include utilizing a hierarchy of agents associated with computing resources of a cloud architecture. An agent in the hierarchy can merge solution encodings to find cover sets indicating feasible placement solutions that can cover an entire application placement request. The agent can partition the components across its children nodes such that global network traffic is minimized. An application graph is generated with components as vertices and edges indicating connections between the components and having associated weights indicating a data transfer rate between the components. The edges can be sorted, and each cover set can be processed by repeatedly assigning unassigned pairs of components having higher data transfer rates to a common assignment set. If multiple placement solutions are found, determined placement costs for each can be used to identify the preferred placement.

20 Claims, 12 Drawing Sheets

(51) Int. Cl.
*H04L 12/911* (2013.01)
*G06F 9/50* (2006.01)

(56) References Cited

U.S. PATENT DOCUMENTS

| | | | |
|---|---|---|---|
| 8,959,523 B2 | 2/2015 | Patil et al. | |
| 9,081,617 B1 | 7/2015 | Pendharkar et al. | |
| 9,641,643 B2* | 5/2017 | Mohaban | H04L 67/327 |
| 2003/0084157 A1* | 5/2003 | Graupner | G06F 9/5066 |
| | | | 709/226 |
| 2003/0236822 A1* | 12/2003 | Graupner | G06F 9/5072 |
| | | | 709/203 |
| 2009/0204789 A1* | 8/2009 | Gooding | G06F 9/5066 |
| | | | 712/28 |
| 2010/0262975 A1* | 10/2010 | Reysa | G06F 9/4843 |
| | | | 718/105 |
| 2013/0031559 A1 | 1/2013 | Alicherry | |
| 2013/0263120 A1 | 10/2013 | Patil et al. | |
| 2013/0325899 A1* | 12/2013 | Mohaban | G06Q 10/10 |
| | | | 707/791 |
| 2015/0128293 A1* | 5/2015 | Hitomi | H04L 65/60 |
| | | | 726/29 |
| 2015/0271280 A1* | 9/2015 | Zhang | H04L 41/145 |
| | | | 709/224 |

OTHER PUBLICATIONS

IEEE 802.11-2012: "Part 11: Wireless LAN Medium Access Control (MAC) and Physical Layer (PHY) Specifications," IEEE Standard for Information technology, Telecommunications and information exchange between systems, Local and metropolitan area networks, Specific requirements, Mar. 29, 2012, 2793 pages.

Kernighan, et al., "An Efficient Heuristic Procedure for Partitioning Graphs," AT&T, Bell Syst. Tech. J., vol. 49, No. 2, Feb. 1970, 5 pages.

Delimitrou, et al., "Tarcil: Reconciling Scheduling Speed and Quality in Large Shared Clusters," ACM, SoCC '15, Aug. 2015, 14 pages.

Boutin, et al., "Apollo: Scalable and Coordinated Scheduling for Cloud-Scale Computing," 11th USENIX Symposium on Operating Systems Design and Implementation (OSDI '14), Oct. 6-8, 2014, 17 pages.

Hindman, et al., "Mesos: A Platform for Fine-Grained Resource Sharing in the Data Center," 8th USENIX Symp. on Networked Systems Design and Implementation (NSDI '11), Mar. 30-Apr. 1, 2011, 14 pages.

Schwarzkopf, et al., "Omega: flexible, scalable schedulers for large compute clusters," ACM, EuroSys'13, Apr. 15-17, 2013, 14 pages.

Szeto, et al., "A Multi-Commodity Flow Based Approach to Virtual Network Resource Allocation," IEEE, GLOBECOM'03, vol. 6, 18 pages.

Vavilapalli, et al., "Apache Hadoop YARN: Yet Another Resource Negotiator," ACM, SoCC'13, Oct. 1-3, 2013, 16 pages.

Verma, et al., "Large-scale cluster management at Google with Borg," ACM, EuroSys'15, Apr. 21-24, 2015, 18 pages.

Xin, et al., "Embedding Virtual Topologies in Networked Clouds," CFI '11 Jun. 13-15, 2011, 4 pages.

Yu, et al., "Rethinking Virtual Network Embedding: Substrate Support for Path Splitting and Migration," ACM SIGCOMM Computer Communication Review, vol. 38, No. 2, Apr. 2008, pp. 19-29.

Zong, et al., "Cloud service placement via subgraph matching," ICDE '14, 2014 IEEE 30th International Conference on Data Engineering, Mar. 31-Apr. 4, 2014, 12 pages.

U.S. Appl. No. 14/856,492, Pending.

* cited by examiner

TOTAL PLACEMENT
COST FUNCTION
510

$$\text{Total\_cost} = \alpha \Sigma_i \Sigma_j \text{CompCost}_{i,j} \, \text{NoVM}_{i,j} + \beta \Sigma_{(u,v) \in E} \, \text{CommCost}(u,v)$$

```
1.  PROCEDURE Service_Placement_Selection
2.  INPUT: Service Query, agent id:
3.      IF agent is a leaf agent THEN
4.          Allocate the resources
5.          Return
6.      END IF
7.      Find a set of cover sets C
8.      FOR every set c in C
9.          Find the network-aware task placement solution (e.g., using
                Network-Aware Component Placement Flow 300 of FIG. 3)
10.     END FOR
11.     FOR every solution
12.         Calculate the cost (e.g., using Total Placement Cost Func. 510)
13.     END FOR
5.      Choose the solution that minimizes the cost
5.      For every child contributed in the solution
16.         Service_Placement_Solution(the subquery assigned to the child)
17.     END FOR
18. END PROCEDURE
```

NETWORK-AWARE
SERVICE PLACEMENT
PSEUDOCODE
520

*FIG. 5*

SYSTEMS AND METHODS FOR DISTRIBUTED NETWORK-AWARE SERVICE PLACEMENT

FIELD

Embodiments of the invention relate to the field of computing systems, and more specifically, to techniques for distributed network-aware service placement.

BACKGROUND

A significant number of cloud applications are network intensive, thus requiring the transmission of large amounts of data between the machines on which they are hosted. Examples of such cloud applications include data parallel applications such as MapReduce jobs, multi-tier web applications, analytic database workloads, storage/backup services, and scientific applications. These applications usually include several inter-related components and operate across dozens of machines. Without a network-aware system for placing workload, the cloud network resources can become a bottleneck for such network-intensive applications—even in well-provisioned clouds. Therefore, to make maximum use of cloud resources, it is of utmost importance not only to efficiently schedule cloud computation resources (e.g., processing, memory, storage, etc.), but also to make efficient use of the networking resources.

However, performing network-aware service placement is not a simple task, and is especially difficult for large-scale cloud infrastructures. A large-scale cloud infrastructure, typically distributed across the world, can include hundreds of thousands of servers and have complex hierarchical network infrastructures to accommodate the workload of cloud applications. Theoretically, such a large-scale cloud could be modeled as a large and complex multi-graph, where the computational resources represent vertices, the available resources on each server are the label of the vertices, and the network across different servers is represented as edges of the graph. Similarly, a service request with multiple tasks, and a network across tasks can be modeled as a graph. Then, the service placement in the cloud can be naturally modeled as a subgraph matching problem, where the goal is to return a network-efficient subgraph of the cloud graph, which is structurally and semantically isomorphic to the service (application) graph. Unfortunately, subgraph matching problem is NP-hard, and current attempts proceeding in this direction do not scale up to contemporary, cloud-size graphs. Further, as a cloud's available resources and the network links can vary over time, the problem of service placement is complicated further. In particular, it is difficult to directly adapt graph theory solutions to accommodate changing conditions because it is hard to collect frequently-changing network available information.

Some existing techniques adapt graph algorithms such as subgraph matching, shortest path and multi-commodity flow problems, etc., to design network-aware cloud service placement. However, these solutions do not scale up to cloud-size graphs and further require accurate network topology and network resource information, which is not always practical in clouds given the time-varying nature of a cloud's available resources.

As one example a technique proposed by Zong et al. (see Bo Zong, Ramya Raghavendra, Mudhakar Srivatsa, Xifeng Yan, Ambuj K. Singh, Kang-Won Lee, "Cloud service placement via subgraph matching", 2014 IEEE 30th International Conference on Data Engineering (ICDE), pp. 832-843) adapts index-based subgraph matching solutions to perform cloud resource placement. This technique models the cloud as a graph and preforms offline graph indexing in order to explore frequent fragments of the cloud graph. It also maintains and updates the cloud available information in a grid structure. Upon receiving a service request, it explores the existing fragments and searches the grid in order to find a subgraph that is isomorphic to the service request. Graph-index based solutions, however, do not scale for cloud-scale graphs because: (i) indexing the graphs to find the frequent fragments is a costly operation, (ii) a large number of fragments leads to a large index size, and (iii) queries that do not contain frequent fragments are not well-supported. Further, this proposal assumes that the cloud network and resource information can be frequently updated using some sort of centralized monitoring tool. However, such a monitoring tool inflicts large network and memory overhead to the system, and thus is not practical.

Another example proposed by Xin et al. (see Y. Xin, I. Baldine, A. Mandal, C. Heermann, J. Chase, and A. Yumerefendi, "Embedding virtual topologies in networked clouds", ACM, 2011, 6th International Conference on Future Internet Technologies, pp. 26-29) includes adapting existing subgraph matching solutions to solve cloud virtual network embedding. In particular, this proposed system focuses upon how to distribute the virtual network across multiple distributed clouds, where every cloud is assumed to be one node of the graph. However, this solution suffers from the scalability problems that exist for the existing subgraph matching solutions it adapts when solving for a large-scale distributed cloud.

Further, another example proposed by Yu et al. (see M. Yu, Yi, Y., Rexford, J., & Chiang, M., "Rethinking virtual network embedding: substrate support for path splitting and migration." ACM SIGCOMM Computer Communication Review, 38(2), 17-29.) adapts multi-commodity flow problem and shortest path in order to find exact network paths for placing a service in a cloud. In this work, the assumption is that the location of the tasks is already set; the solution then takes into account the exact network topology and utilizes either shortest path or multi-commodity flow problem to find the exact paths. However, the cloud network topology is very complex and it is not always practical to make a network path reservation for a service.

Additionally, although there are a wide range of cloud platforms in active use, these solutions either separately solve for network and computation resources, or fundamentally rely upon overprovisioning of the network resources.

Accordingly, techniques are desired for performing network-aware service placement to efficiently utilize the cloud network resources without requiring the exact cloud network topology or a graph representing it. Also, such techniques are desired that do not dictate any network reservation, which is not always an option for data centers. Further, techniques are desired that do not rely upon having, at a central location, access to real-time network information.

SUMMARY

Systems, methods, apparatuses, and computer-readable media are provided for network-aware service placement. In some embodiments, an application can be efficiently, effectively, and flexibly placed in a pool of cloud network resources.

In some embodiments, a hierarchy of agents can identify a network-optimal placement configuration for a multi-component application within a distributed cloud satisfying the requirements of the application. In some embodiments, this network-aware service placement does not utilize any centrally-maintained repository of resource availability or topology information of all resources in the cloud.

According to some embodiments, an exemplary method is performed by a root agent executing at an electronic device for network-aware decentralized service placement. The root agent acts as a parent to a plurality of intermediate agents in a hierarchy of agents, and each of the plurality of intermediate agents acts as a parent to one or more descendant agents associated with one or more electronic devices having resources available for service placement. The method includes receiving, at the root agent, a plurality of sets of solution encodings corresponding to the plurality of intermediate agents. Each of the plurality of sets of solution encodings indicates possible placements of some or all of a plurality of components of an application that the one or more electronic devices associated with the one or more descendant agents of the intermediate agent can locally provide while satisfying requirements of the some or all of the components. The method further includes generating, by the root agent based upon the plurality of sets of solution encodings, one or more cover sets indicating feasible placement solutions that can successfully satisfy the requirements of all of the components of the application. The method further includes partitioning, by the root agent for each of the one or more cover sets, the components of the application into a plurality of assignment sets corresponding to the plurality of intermediate agents while adhering to the feasible placement solutions of the cover set to indicate placements of the plurality of components that minimize network traffic travelling between electronic devices associated with the plurality of intermediate agents that would result from the placements, to yield one or more candidate placement solutions. The method further includes transmitting, by the root agent to a first intermediate agent of the plurality of intermediate agents, a service placement solution indicating one or more of the plurality of components that are to be placed by the first intermediate agent according to a selected one of the one or more candidate placement solutions.

In some embodiments, the method further includes prior to the receiving of the plurality of sets of solution encodings, transmitting a service request description to each of the plurality of intermediate agents, wherein the service request description specifies the requirements for the plurality of components, and wherein the plurality of sets of solution encodings are received from the plurality of intermediate agents.

In some embodiments, the partitioning includes generating, by the root agent, an application graph including a plurality of vertices corresponding to the plurality of components of the application and a plurality of edges connecting pairs of the plurality of vertices, wherein each of the plurality of edges is associated with a data transfer amount expected to be transmitted between the pair of components connected by the edge. In some embodiments, the partitioning further includes generating a sorted list of edges including all of the plurality of edges that is sorted according to the data transfer amounts of the plurality of edges. In some embodiments, the partitioning further includes, for each of the one or more cover sets, (a) when one or more of the plurality of components are determined to have an inflexible placement location based upon the cover set, placing the one or more components into the plurality of assignment sets based upon the inflexible placement locations, and (b) iteratively processing one or more edges of the sorted list of edges to assign one or more of the plurality of components to the assignment sets until all of the sorted list of edges have been processed or until all of the components have been placed into the plurality of assignment sets.

In some embodiments, the one or more candidate placement solutions comprise a plurality of candidate placement solutions, and the method further includes determining a plurality of cost values corresponding to the plurality of candidate placement solutions, wherein each of the plurality of cost values is determined based upon an anticipated amount of network traffic resulting between the electronic devices associated with the plurality of intermediate agents that would result from the corresponding candidate placement solution being selected, and also determining the selected one of the plurality of candidate placement solutions based upon the determined plurality of cost values.

According to some embodiments, an exemplary method is performed by an intermediate agent executing at an electronic device for network-aware decentralized service placement. The intermediate agent acts as a parent to a plurality of leaf agents in a hierarchy of agents and further acts as a child to another agent in the hierarchy. The method includes receiving, at the intermediate agent from the another agent, a service placement solution indicating one or more of a plurality of components of an application that are to be placed by one or more electronic devices associated with the plurality of leaf agents that have resources available for service placement. The method further includes generating, by the intermediate agent based upon the received service placement solution and further based upon a plurality of solution encodings indicating possible placements of some or all of the plurality of components that the one or more electronic devices can provide while satisfying requirements of the some or all of the plurality of components, one or more cover sets indicating feasible placement solutions that can successfully satisfy the requirements of the one or more components. The method further includes partitioning, by the intermediate agent for each of the one or more cover sets, the one or more components of the application into a plurality of assignment sets corresponding to the plurality of leaf agents while adhering to the feasible placement solutions of the cover set to indicate placements of the one or more components that minimize network traffic between the one or more electronic devices associated with the plurality of agents that would result from the placements to yield one or more candidate placement solutions. The method further includes transmitting, by the intermediate agent to a first leaf agent of the plurality of leaf agents, a service placement solution indicating one or more of the one or more components that is to be placed by the electronic device associated with the first leaf agent according to a selected one of the one or more candidate placement solutions.

In some embodiments, the another agent comprises a root agent in the hierarchy. In some embodiments, however, the another agent comprises another intermediate agent in the hierarchy.

In some embodiments, the requirements include at least one affinity or location constraint associated with one or more of the plurality of components.

In some embodiments, the one or more components includes a plurality of components, and the partitioning includes generating an application graph including a plurality of vertices corresponding to the plurality of components and a plurality of edges connecting pairs of the plurality of vertices, wherein each of the plurality of edges is associated with a data transfer amount expected to be transmitted between the pair of components connected by the edge.

In some embodiments, the partitioning further includes generating a sorted list of edges including all of the plurality of edges, wherein the sorted list of edges is sorted according to the data transfer amounts of the plurality of edges. In some embodiments, the partitioning further includes, for each of the one or more cover sets, (a) when one or more of the plurality of components are determined to have an inflexible placement location based upon the cover set, placing the one or more components into the plurality of assignment sets based upon the inflexible placement locations, and (b) iteratively processing one or more edges of the sorted list of edges to assign one or more of the plurality of components to the assignment sets until all of the sorted list of edges have been processed or until all of the components have been placed into the plurality of assignment sets.

In some embodiments, the one or more candidate placement solutions comprise a plurality of candidate placement solutions, and the method further includes determining a plurality of cost values corresponding to the plurality of candidate placement solutions, wherein each of the plurality of cost values is determined based upon an anticipated amount of network traffic resulting between the plurality of intermediate agents that would occur from the corresponding candidate placement solution being selected, and also determining the selected one of the plurality of candidate placement solutions based upon the determined plurality of cost values.

According to some embodiments, a non-transitory computer-readable storage medium has instructions which, when executed by one or more processors of an electronic device, cause the electronic device to implement a root agent act as a parent to plurality of intermediate agents in a hierarchy of agents. Each of the plurality of intermediate agents acts as a parent to one or more descendant agents associated with one or more electronic devices having resources available for service placement. The root agent is to perform network-aware decentralized service placement by performing operations, including receiving a plurality of sets of solution encodings corresponding to the plurality of intermediate agents. Each of the plurality of sets of solution encodings indicates possible placements of some or all of a plurality of components of an application that the one or more electronic devices associated with the one or more descendant agents of the intermediate agent can locally provide while satisfying requirements of the some or all of the components. The operations further include generating, based upon the plurality of sets of solution encodings, one or more cover sets indicating feasible placement solutions that can successfully satisfy the requirements of all of the components of the application. The operations further include partitioning, for each of the one or more cover sets, the components of the application into a plurality of assignment sets corresponding to the plurality of intermediate agents while adhering to the feasible placement solutions of the cover set to indicate placements of the plurality of components that minimize network traffic travelling between electronic devices associated with the plurality of intermediate agents that would result from the placements, to yield one or more candidate placement solutions. The operations further include transmitting, to a first intermediate agent of the plurality of intermediate agents, a service placement solution indicating one or more of the plurality of components that are to be placed by the first intermediate agent according to a selected one of the one or more candidate placement solutions.

According to some embodiments, a non-transitory computer-readable storage medium has instructions which, when executed by one or more processors of an electronic device, cause the electronic device to implement an intermediate agent to act as a parent to a plurality of leaf agents in a hierarchy and further to act as a child to another agent in the hierarchy to perform network-aware decentralized service placement by performing operations. The operations include receiving, from the another agent, a service placement solution indicating one or more of a plurality of components of an application that are to be placed by one or more electronic devices associated with the plurality of leaf agents that have resources available for service placement. The operations further include generating, based upon the received service placement solution and further based upon a plurality of solution encodings indicating possible placements of some or all of the plurality of components that the one or more electronic devices can provide while satisfying requirements of the some or all of the plurality of components, one or more cover sets indicating feasible placement solutions that can successfully satisfy the requirements of the one or more components. The operations further include partitioning, for each of the one or more cover sets, the one or more components of the application into a plurality of assignment sets corresponding to the plurality of leaf agents while adhering to the feasible placement solutions of the cover set to indicate placements of the one or more components that minimize network traffic between the one or more electronic devices associated with the plurality of agents that would result from the placements to yield one or more candidate placement solutions. The operations further include transmitting, to a first leaf agent of the plurality of leaf agents, a service placement solution indicating one or more of the one or more components that is to be placed by the electronic device associated with the first leaf agent according to a selected one of the one or more candidate placement solutions.

BRIEF DESCRIPTION OF THE DRAWINGS

The invention may best be understood by referring to the following description and accompanying drawings that are used to illustrate embodiments of the invention. In the drawings:

FIG. 5 illustrates a total placement cost function and network-aware service placement pseudocode according to some embodiments.

DESCRIPTION OF EMBODIMENTS

Figure 1:
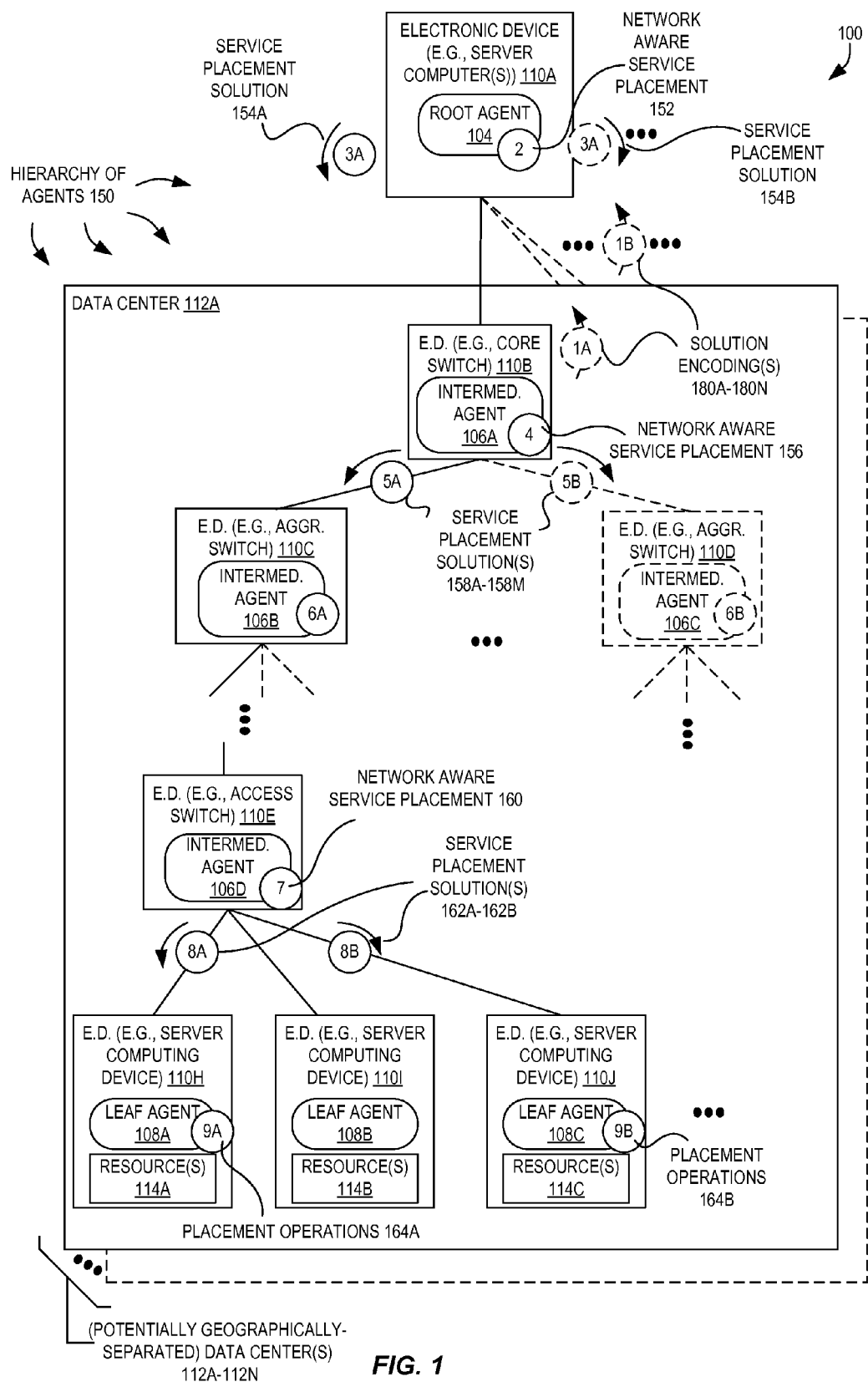
FIG. 1 is a high-level block diagram illustrating distributed processing for decentralized network-aware service placement across one or potentially more data centers according to some embodiments.

The following description relates to the field of computing systems, and more specifically, describes methods, systems, apparatuses, and computer-readable media for distributed network-aware service placement.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Further, as used herein and unless indicated otherwise based upon the context of use, the terms "task" and "component" may be used as synonyms to generally refer to a software unit that is part of an application. Some applications include multiple tasks/components, which can potentially be executed by different electronic devices as part of executing the overall application. Accordingly, an application can include one or more tasks/components, which can potentially be executed by one or multiple electronic devices. The execution of the application may be referred to herein as a "service," though these two terms can sometimes be used somewhat interchangeably depending upon the context.

According to some embodiments, efficient network-aware service placement in large scale and/or geo-distributed cloud infrastructures is enabled through use of distributed service placement techniques. In some embodiments, the system can execute in a distributed and parallel fashion via distributed network-aware service placement agents (e.g., software modules), which run over a hierarchical structure corresponding to the cloud architecture. Each agent, upon receiving a service placement request, can take the application graph and its networking requirements into account and greedily partition the application components over the available cloud resources (e.g., datacenter/pods/racks) such that the global networking requirement is minimized while its computation and affinity requirements are maintained. In some embodiments, the system only needs to be aware of the cloud network hierarchical architecture, and does not need any real-time network traffic/availability information, making it especially effective given the huge overhead that would be required to perform robust network information collection at the data center level. Further, in some embodiments, multiple agents operating at a same level in the hierarchy can run in parallel, and can perform decision-making based upon the local information of the available cloud's local computational resources, making it highly scalable for using in a large scale cloud infrastructure.

Some embodiments can execute "on top" of the cloud hierarchical network infrastructure, and can not only satisfy the computational requirements of cloud services, but also takes their network requirements into account in order to make extremely efficient use of the cloud networking resources. Embodiments are well-suited for placing both existing and future cloud applications that utilize several tasks (or components) with certain network connectivity, computational, and/or affinity requirements. Moreover, embodiments described herein are highly scalable and make efficient use of the cloud networking resources without requiring access to the real-time network resources information.

For example, many factors of the discussed embodiments can contribute to the scalability and efficiency. First, in some embodiments there is no need for real-time network monitoring. Because data center networks are very complex and the network resources can vary rapidly, some existing data center network resource management solutions instead typically rely on overprovisioning, and thus do not assume any centralized monitoring for network resources. Consistent with the existing data center solutions, embodiments disclosed herein also do not require any centralized and real-time network monitoring, but do not require or rely upon overprovisioning. Instead, embodiments can leverage the hierarchical architecture of a cloud to automate network-aware service placement in order to localize the network traffic as much as possible. By placing the most network-intensive components/tasks under the same lower level network nodes, embodiments provide flexibility for routing algorithms to efficiently utilize all of the available network links and to avoid network bottlenecks.

Additionally, embodiments have substantial scalability because the computational intensity is very low because they centrally utilize the application graph and the cloud hierarchical architecture (i.e., the number of levels and the height of the cloud graph), and thus are especially effective when operating with a large-scale cloud. In some embodiments, a received service request is processed over the hierarchical cloud resource tree. In some embodiments, at each node of the tree, an agent decides how to partition the service query or subquery across its children nodes, when they exist. Therefore, the complexity of the solution depends on the number of tasks and their connections and the number of nodes at each level of the logical resource tree.

Moreover, in contrast to existing systems, embodiments utilize a distributed approach. Instead of using a centralized controller, embodiments adapt a group of distributed agents that can collectively decide on the application placement. Each agent can work independently and make local decisions based on the available resources across its local domain. Accordingly, embodiments can be implemented with many lightweight computationally efficient processes resulting in a scalable solution for practical use in a variety of contexts.

FIG. 1 is a high-level block diagram illustrating a system 100 performing distributed processing for decentralized network-aware service placement across one or potentially more data centers 112A-112N according to some embodiments. The data centers 112 can include one or more electronic devices 110B-110J providing various functionalities for a cloud hosting/execution environment, and can include networking devices (e.g., switches, routers, bridges, etc.), server computing devices (e.g., electronic devices 110H-110J), etc.

In various embodiments, a set of computing resources (e.g., a cloud) can be viewed as a hierarchical resource tree regardless of whether it includes resources of only a single data center (e.g., 112A), or resources of a set of connected datacenters assembled into a distributed cloud (e.g., 112A-112N). The resource tree can be viewed as an abstract model where each node in the resource tree can be associated with a corresponding physical entity in the cloud infrastructure. Each node in this abstract resource tree comprises an agent (104, 106, 108), and thus the hierarchical resource tree can be viewed as a hierarchy of agents 150, where particular agents can manage and/or execute the different phases of network-aware service placement as described herein.

The agents (104, 106, 108) can potentially execute in parallel (i.e., simultaneously or at least partially simultaneously), and in some embodiments each agent is configured to communicate only with its parent agent or its children agent(s). In some embodiments, though, agents can communicate with its "siblings" (i.e., other agents acting at a same level of the hierarchy) as well, sharing information if needed. Further, in some embodiments, agents can bypass one or more levels of the tree in either direction.

Agents can have different roles depending on their place in the resource tree and the physical resource that they may be associated with (or represent). Each agent can be configured to locally maintain information about available resources on the physical resource(s) (e.g., resources 114A-114C) associated with it, and can make local decisions based on this data. As the agents are placed as nodes in the hierarchy 150, an agent can be a root agent 104 and thus have only children, an intermediate agent 106 having both a parent agent and one or more children agents, or a leaf agent 108 having only a parent. Of note, although the root agent 104 is depicted as being external to the potentially geographically separated data centers 112A-112N, in some embodiments the root agent 104 may be within one of these data centers.

In some embodiments, there can be a one-to-one mapping between electronic devices (e.g., server computing device, network device, etc.) in the cloud and a node/agent of the hierarchical resource tree. In some embodiments, groups of electronic devices in the cloud can mapped to one node of the logical tree. However, the logical tree preserves the precedence of the electronic devices. For example, if a first switch connects via a top-of-rack (TOR) switch to a higher-level core switch, the corresponding logical node of the first switch will be in a level of the hierarchy 150 that is lower than that of the core switch or in the same level of the core switch, but it will not be in a level higher than that of the core switch.

In some embodiments, those electronic devices providing resources 114 to be utilized for service placement will be leaf agents 108 of the logical resource tree, though in other embodiments this is not strictly necessary.

Additionally, the nature of the embodiments presented herein do not depend upon the physical placement of the agents. Therefore, depending on the physical placement of the agents, there are several possible embodiments, including: (i) a fully distributed configuration, where an agent is assigned and collocated with each electronic device (e.g., server computing device, aggregate switch, router, etc.) in the cloud, (ii) a semi-distributed configuration, where each agent is assigned to a group of physical resources/electronic devices and located close to them, and (iii) a centralized configuration, where agents are organized similar to the semi-distributed deployment, but the agents may run in a single physical server (or a few physical servers). Of course, the placement of agents is not limited to the described embodiments.

In some embodiments, network-aware service placement can include two phases: (i) feasible solution exploration, i.e., finding a set of candidate placements for every task of the application, and (ii) service placement selection, i.e., electing the solution and placing the request.

First Phase: Feasible Solution Exploration

The first phase of feasible solution exploration can be performed in a variety of ways by a variety of different entities.

With such service requests, the first phase (i) can utilize "online distributed service placement exploration" to generate solution encodings 180A-180N describing the combinations of the tasks that can be placed on the electronic devices associated with a particular node and/or its children in the hierarchy.

For example, in some embodiments, service placement requests can be received from some external entities (e.g., via a cloud web portal or application programming interface (API) call). Each service request can include a specification of the requirements of all resources needed by every task in the application. In particular, a service request can describe how tasks are "connected" and what the data transfer rate between some or all pairs of tasks are. Further, service requests can include the computational resources required for every task—e.g., a number of CPU cores, an amount of memory, an amount of storage, etc. Furthermore, service requests can include requirements about geographical location and/or affinity constraints.

In some embodiments using this online distributed service placement exploration process, an agent in the logical resource tree, upon receiving such a service placement request, encodes the request in order to group the tasks according to their resource requirements and other constraints (e.g., affinity and/or location constraints). Then, the encoding is sent downward through the tree to its children. Ultimately, the leaf agents identify various combinations of the feasible placements based upon determining whether the associated electronic device can afford the required resources, depending upon the availability of computational resources and the computational requirements of the tasks. Next, the leaf agents can send the feasible solutions to its parent agent, which can consolidate all such responses received from its children into a compact format (e.g., by removing redundant feasible solutions, solutions that are a subset of other solutions) to realize the feasible placement that can be afforded by all of the electronic devices under its control (e.g., all electronic devices associated with its children and/or descendent agents in the hierarchy). This process repeats up to the root level of the tree. At the end, every agent in the tree knows their feasible set of solutions, i.e., all the combination of the tasks that can be potentially placed in servers under its control in a compact fashion. For example, service requests can be transformed by the hierarchy of agents 150 into the solution encodings 180A-180N, and these solution encodings can be provided (per FIG. 1, circles '1A' and '1B') from agents in the hierarchy serving as "children" to the root agent 104. Further detail regarding operations for performing such a transformation via "online distributed service placement exploration" is provided later herein with regard to FIGS. 8, 9, and 10.

Another way to perform the first phase (i) of feasible solution exploration can involve "event-based distributed service placement exploration," which is based on the existing Infrastructure-as-a-Service (IaaS) platforms such as OpenStack, which typically offer different virtual machine (VM) flavors and containers, where each flavor comes with a set of computational capacity characteristics such as the memory size, and the number of vCPUs. Upon submission of a service request, the cloud users typically choose the best VM/container flavor fitted to their request. In this approach, the leaf agents, upon a significant change to their available computation resources, can use a technique similar to the online distributed service placement exploration described above to explore the compact combinations of all VM flavors that they can "afford" and send the results up the hierarchy to their parent agents. Parent agents can consolidate the results, and similarly send the results back to their parent. Accordingly, every agent can have access to an up-to-date status of the available VMs, which can be performed by the computational resources under its control. Upon receiving a service placement request, every agent can thus explore its set of available VMs, and extract the combination of tasks that can be afforded given its feasible set and the affinity requirements of the service request.

As an example, consider a service request requiring six tasks, where two of the tasks require a "first type" of VM, three of the tasks require a "second type" of VM, and one of the tasks requires a "third type" of VM. The service request can be represented as [2, 3, 1].

As an example, the feasible solution encodings for an arbitrary node could be given as follows: [2, 2, 0] and [0, 3, 1], which indicates that the node can host either: two VMs of "type one" and two VMs of "type two", or it can host 3 VMs of "type two" and one VM of "type three."

However, there are other ways to transform service requests into solution encodings, and further, there are other ways to acquire solution encodings. For example, in some embodiments, the solution encodings could be provided by a human user or directly generated using input from a human user. However, for the purposes of this description, we assume that the first phase (i) involves and/or results in tasks being grouped according to their resource requirements and any of their affinities, and the feasible solutions are given as a set of solution encodings, which will be detailed in the examples below.

Second Phase: Service Placement Selection

The following description, corresponding to FIGS. 1-7, focuses upon the second phase—e.g., finding a network-efficient solution among multiple candidate solutions. In some embodiments, every node (i.e., agent) in the logical tree has access to a set of feasible solutions for the service request describing the combinations of the tasks that can be placed on the servers associated with the node or its children.

Figure 2:
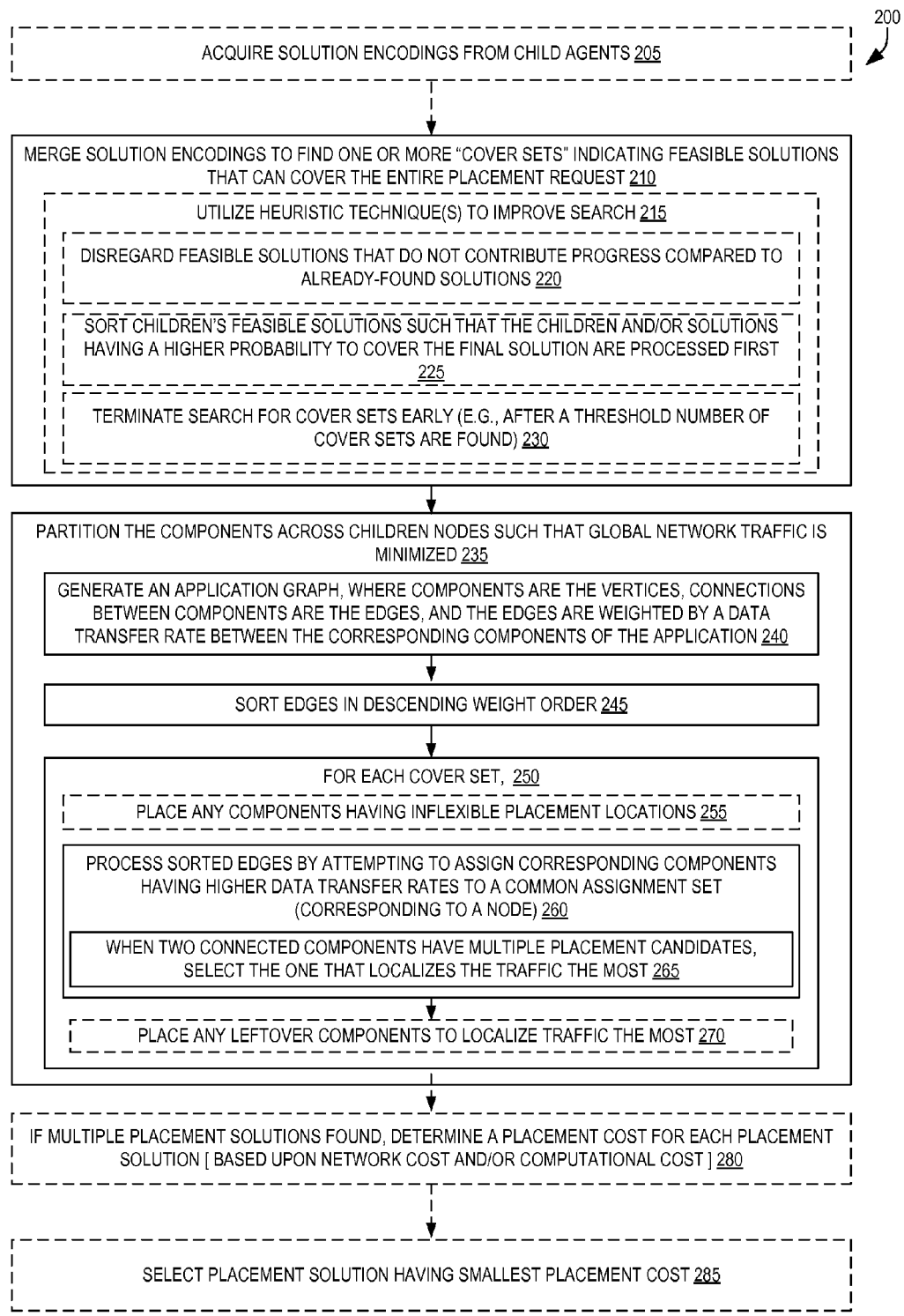
FIG. 2 is a flow diagram illustrating an exemplary flow for decentralized network-aware service placement according to some embodiments.

An overview of network-aware service placement selection is presented in FIG. 2, which is a flow diagram illustrating an exemplary flow 200 for decentralized network-aware service placement according to some embodiments. The flow 200 can be performed by the root agent 104 of FIG. 1.

At block 205, the flow optionally includes acquiring solution encodings from one or more child agents. For example, in some embodiments, a service placement request is received (e.g., from an external client) and the agents first find the feasible solution set, for example, using one of the aforementioned techniques, and return solution encodings to the root agent 104. Referring to FIG. 1, at this point, the network-aware service placement 152 can start at the root agent 104 (at circle '2') and executes thereafter in a recursive fashion down through the hierarchy as explained in the following sections. In some embodiments, the service placement selection includes three phases.

In a first phase, represented by block 210 of FIG. 2, the flow 200 includes merging the solution encodings to find one or more "cover sets" indicating feasible solutions that can cover the entire placement request. A cover set is a set of feasible solutions from one or more children that can "cover" (i.e., satisfy the requirements of) the entire service request.

Consider an example with the service request from above (e.g., [2, 3, 1]) where an agent receives the following feasible solutions from its two children:
Child 1: [2,2,0] and [1,1,1]
Child 2: [1,1,1], [0,0,3], [2,1,1], and [0,3,0]
Then the agent can find the cover-sets as follows:
Cover-set (1): Child 1: [2, 2, 0], Child 2: [1, 1, 1]
Cover-set (2): Child 1: [1, 1, 1], Child 2: [2, 1, 1]
Observe that the sum of the solution from children in the above cover-sets is greater or equal to the service request, i.e., [2, 3, 1].

The Cartesian product of the feasible solutions typically obtains the cover-sets from all children. However, it is not always practical to calculate all of the products of the feasible solutions as it causes curse of dimensionality (i.e., a state explosion). Accordingly, in some embodiments various heuristic techniques can be used to perform this stage, as indicated by block 210 of FIG. 2. The overall idea is to make the product as compact as possible using one or more techniques.

For example, at block 220, one technique can include disregarding feasible solutions that do not contribute any progress compared to the existing ones. For the previous example, given the required solution of [3, 2, 1], the product of [1, 1, 1] from Child 1 and [0, 0, 3] from Child 2 results in [1, 1, 1], which provides no additional progress compared to the solution [1, 1, 1] from Child 1.

As another example, at block 225, another technique that can be used includes sorting the children's feasible solutions such that the children or the solutions that have a higher probability to cover the final solution come earlier. Put another way, the children's feasible solutions can be sorted so that the ones that cover more tasks in total come first in the analysis. For the previous example, the solution of Child 2 can be sorted as: [2,1,1], [1,1,1], [0,0,3] and [0,3,0].

As yet another example, at block 230, another technique that can be used includes stopping the cover-set search once enough number of cover-sets are found, and/or at least one cover-set is found and the number of products exceeds a threshold.

Various embodiments can be configured to use all three of these techniques, one or two of these techniques, or none of these techniques.

At this point, the "second" phase of service placement selection is represented by block 235, where the components/tasks of the application can be partitioned across children nodes such that a resulting amount of "global" network traffic is minimized. This partitioning can partition tasks such that tasks that have higher data transfer rate are placed together on the same child node as much as possible in order to localize the traffic within nodes and reduce the traffic across nodes.

In some embodiments, block 235 includes block 240, where an application graph is generated, where tasks/components represent vertices, and task connections represent the edges. The edges can be weighted by the sum of the data transfer rate between the components represented by the corresponding vertices.

In some embodiments, block 235 includes block 245, where the edges are sorted according to their weights in descending order. Next, for each cover set (block 250), optionally any components having inflexible placement locations can be placed (at block 255). For example, if a component has a geographic constraint and only one placement location exists that satisfies the constraint, the component can be placed at that location.

At block 260, the sorted edges are processed (e.g., one by one) to attempt to assign the components that have higher data transfer rate to the same node. For example, as indicated by block 265, when two connected components have multiple placement candidates, the one that localizes the traffic the most can be chosen. This process can occur according to the flow 400 described in FIG. 4, described later herein.) Finally, at block 270, optionally any leftover components that exist (i.e., unassigned components) can be placed at nodes that will localize the traffic the most (which again can occur using the flow 400 of FIG. 4).

Figure 3:
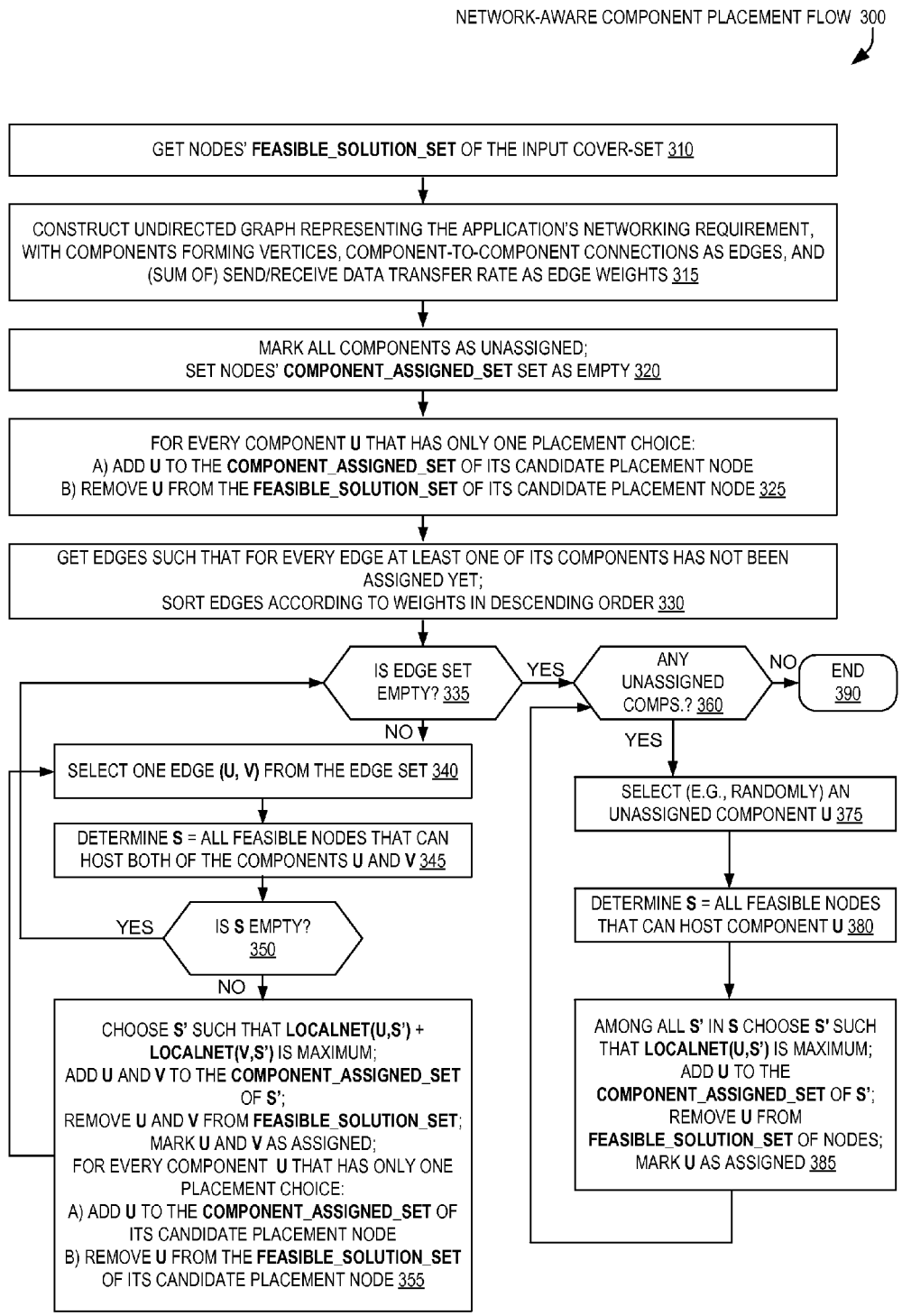
FIG. 3 is a flow diagram illustrating an exemplary flow for partitioning components of an application to minimize inter-node network traffic according to some embodiments.

For further detail regarding the partitioning of components 235, FIG. 3 is a flow diagram illustrating an exemplary flow 300 for partitioning components of an application to minimize inter-node network traffic according to some embodiments.

To evaluate multiple placement candidates for two connected components or an individual component, this flow can be used. For a given component and a given node, the flow quantifies the amount of traffic that would be localized if the component would be assigned to the node. Thus, the flow calculates the data transfer rate between the input component and the following group of components: (i) all other components that are already assigned to the node, and (ii) all other components that are not assigned to a node yet, but that the input node is one of their placement candidates. In one embodiment, the local traffic of the above two groups can be arithmetically summed, but in another embodiment, the weighted sum of the local traffic for the above two groups is used, thereby assigning more weight for those components that have been already assigned to the input node.

Turning to FIG. 3, at block 310 the flow 300 includes acquiring the nodes' feasible solution set of the input cover set and then, at block 315, constructing an undirected graph representing the application's networking requirement. The undirected graph includes vertices representing components, component-to-component network connectivity as edges of the graph, and a data transfer rate as weights of the edges.

At block 320, optionally all components are initialized as being unassigned (if they have not been done so already), and a component_assigned_set data structure for each node is set as empty. At block 325 (corresponding to optional block 255), for every component "u" that has exactly/only one placement possibility, "u" is added to the component_ assigned_set of its candidate placement node, and "u" is removed from the feasible_solution_set of its candidate placement node.

At block 330 (corresponding to block 245), the flow 300 includes identifying edges such that for every edge, at least one of its components has not been assigned yet, and then sorting these edges according to weights in descending order. Note how, in this flow 300, the operations are performed in a slightly different order than the flow 200 of FIG. 2 (e.g., blocks 325 and 330, which correspond to blocks 255 and 245 respectively, occur in different orders). Accordingly, while the flow diagrams in these figures show a particular order of operations performed by some embodiments, it should be understood that such order is exemplary and that alternative embodiments may perform the operations in a different order, combine certain operations, overlap certain operations, etc.

Then, a determination can be made at block 335 as to whether the edge set is empty. If not, flow continues at block 340, where an edge (represented by two components "U" and "V" as (U, V)) is selected from the edge set. At block 345, set "S" is determined, which is all feasible nodes that can host both of the components "U" and "V". If, at block 350, this set is empty, flow continues back to decision block 335. Otherwise, if the set is not empty, flow continues to block 355, where S' (S prime) is chosen such that a value of LOCALNET(U, S')+LOCALNET(V,S') is a maximum.

Figure 4:
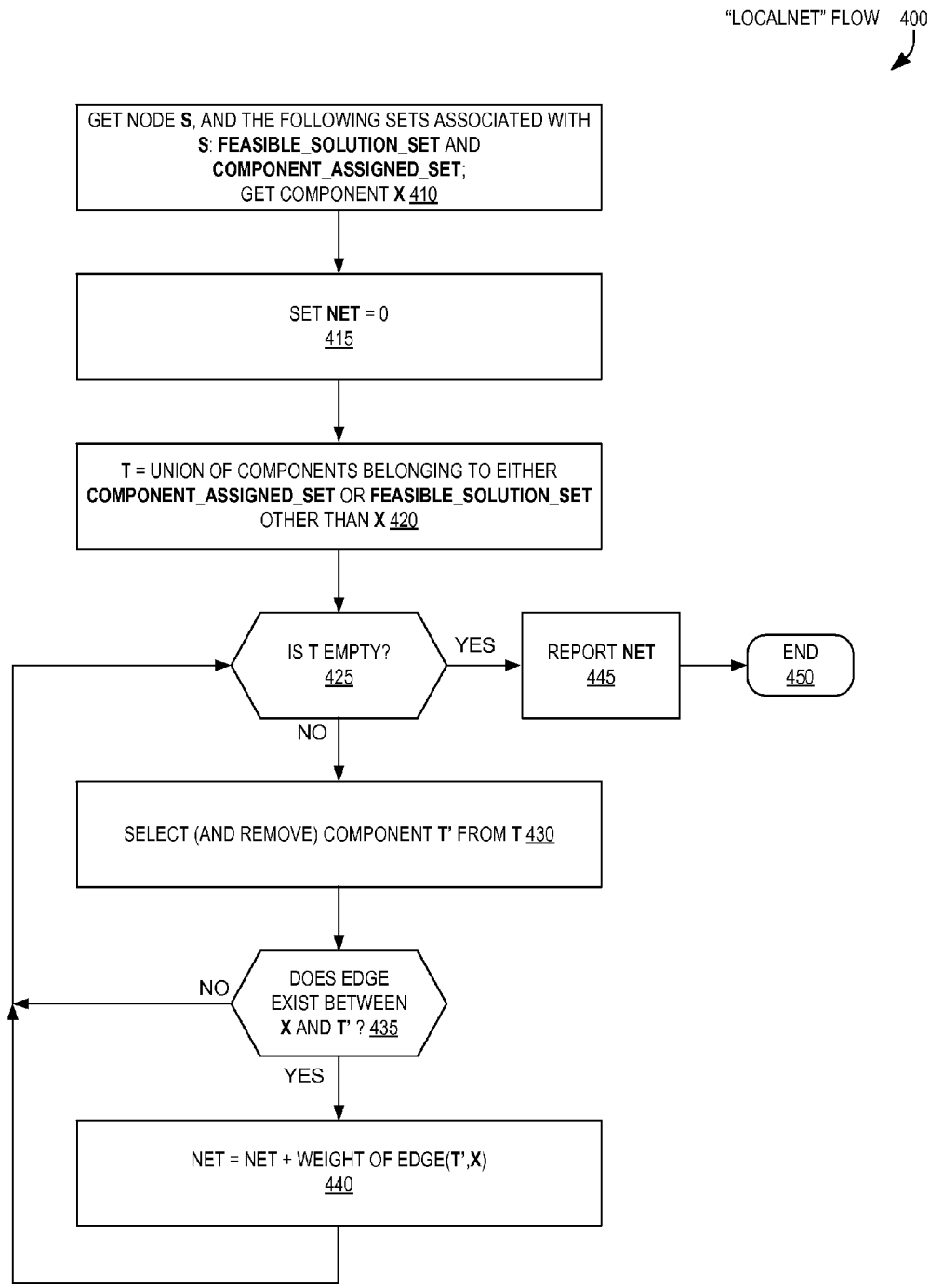
FIG. 4 is flow diagram illustrating an exemplary flow for determining an inter-node traffic amount for a candidate application placement that can be utilized for evaluating multiple candidate application placements according to some embodiments.

In some embodiments, LOCALNET is a procedure that determines an amount of local traffic between a component and other components in a node. As one example, FIG. 4 is flow diagram illustrating an exemplary flow 400 for determining an inter-node traffic amount for a candidate application placement that can be utilized for evaluating multiple candidate application placements according to some embodiments. This flow 400 can represent the operations of such a LOCALNET procedure.

The flow 400 includes, at block 410, acquiring/identifying the input component (here deemed "X") along with the node "S", and the following sets associated with S: the feasible_ solution_set data structure and the component_assigned_ set data structure. At block 415, a "net" data value is set to 0, and at block 420, a set "T" is set to be the union of all components belonging to either the component_assigned_ set data structure or the feasible_solution_set data structure (aside from the input "X" component).

If, at decision block 425, T is determined to be empty, the value of "net" is returned at block 445, and the flow ends at 450. However, if at decision block 425 T is determined to not be empty, the flow continues at block 430, where a component T' (T prime) is selected and removed from the set T. At decision block 435, it is determined whether an edge exists between the selected component T' and the input component X—if so, the "net" value is increased by the weight of the edge between T' and X (and then the flow continues back to block 425). If not, flow proceeds immediately back to block 425. Accordingly, this LOCALNET flow 400 can determine the amount of "local" traffic between a component and other components in a node.

Turning back to FIG. 3, and block 355 where S' is chosen such that a value of LOCALNET(U, S')+LOCALNET(V,S') is a maximum. With S' selected, U and V are added to the component_assigned_set data structure to indicate that they have been assigned, and U and V are removed from the feasible_solution_set and marked as assigned. Additionally, for every component U that has only one placement choice, U is added to the component_assigned_set of its candidate placement node and removed from the feasible_solution_set of its candidate placement node. Flow then continues back to block 340.

Eventually, all edges will be processed and flow will continue back to block 335, where the flow will then proceed to decision block 360, where it is determined whether any unassigned components still exist. If so, flow continues to block 375 and selecting (e.g., randomly, according to a selection scheme, in order, etc.) an unassigned component "U" and at block 380, set "S" is determined to include all feasible nodes that can host the component U. At block 385, the flow includes choosing S', among all S' in S, such that LOCALNET(U, S') is maximized, and thus U is added to the component_assigned_set of S', and U is removed from the feasible_solution_set of the nodes and marked as assigned. Flow continues back to block 360 for further placement of any other existing unassigned components. Once all components have been assigned, flow continues to block 390 and the flow 300 ends.

Turning back to FIG. 2, after the partitioning of the components at block 235, the flow 200 optionally continues with block 280 and, if multiple placement solutions were found, a placement cost is determined for each placement solution. This placement cost can be based upon, for example, a global network cost of each solution and/or a determined computational cost of each solution.

For example, in some embodiments where the requested components are VMs, every agent can have an estimate of the cost per type of VM across all of its children, that is, the average computation cost over all of its children nodes. In some embodiments, the cost is statically assigned to every node, but in other embodiments the costs can change over time and the agents can be regularly/periodically updated with a new cost (e.g., by an external entity). For example, the cloud operator for a given server or cluster can determine/calculate a cost for each VM type according to the energy efficiency of the servers, the electricity price, and the resource requirements of the VM types.

As one example of a placement cost determination, FIG. 5 illustrates an exemplary total placement cost function 510 (and network-aware service placement pseudocode 520) according to some embodiments. Suppose VM types are indexed by "i," and children nodes are indexed by "j." Further, for a given placement solution, we set $NoVM_{i,j}$ to denote the number of VMs of type i which are placed on node j. Also E is set to be the set of edges of the input service, and the total cost per placement solution could be calculated as follows:

$$Total\_cost = \alpha \Sigma_i \Sigma_j CompCost_{i,j} NoVM_{i,j} + \beta \Sigma_{(u,v) \in E} CommCost(u,v)$$

where $\alpha$ and $\beta$ denote the weights for the computation and communication costs, respectively, $CompCost_{i,j}$ denotes the computation cost per VM of type i in node j, and CommCost(u,v) denotes the global traffic between tasks u and v for the given placement solution. CommCost(u,v) is zero when components u and v are both placed on the same node, and otherwise set to the weight of the edge u–v in the application graph. In some embodiments, this Total_cost value can be calculated for each placement solution, and then the solution that yields the smallest cost can be chosen as the preferred placement solution.

Finally, at block 285, the selected service placement solution can be sent to the some or all children of the agent. For example, the selected service placement solution can be sent to only those agents that are responsible for placing at least one portion (e.g., component) of the application, but in some embodiments the selected service placement solution can be sent to all of the child agents of a particular agent performing the network-aware service placement.

Turning back to FIG. 1, the network-aware service placement 152 at circle '2' is now complete, and the root agent 104 can transmit at circles '3A' one or more service placement solutions 154A-154B to its children agents. As detailed above, this transmission can occur based upon the selected placement solution, and thus, in some scenarios the service placement solutions 154A-154B may only be transmitted to those of its children that are responsible for placing at least one component. However, in other embodiments, service placement solutions 154A-154B may be transmitted to each child agent of the root agent 104 regardless of whether the recipient agent is responsible for placing any components. A service placement solution can, in some embodiments, specify only those of the components/tasks that need to be placed by the recipient agent and thus the service placement solution transmitted can be different for each recipient. Alternatively, a service placement solution can specify which of the components/tasks are to be placed by particular agents (e.g., include component identifiers associated with agent identifiers, for example). In embodiments where service placement solutions are sent to all child agents of a sending agent regardless of whether one or more of the child agents will even be responsible for participating in component placement, each agent can potentially be provided full visibility into the ultimate placement of the application.

Next, at circle '4', another network-aware service placement 156 can be performed by each recipient the intermediate agent 106A to determine how it will place the components that it is responsible for placing. At the conclusion of another network-aware service placement 156 scheme (e.g., flow 200), the intermediate agent 106A can similarly transmit one or more service placement solutions 158A-158M to its children agents at circles '5A'-'5B' based upon the results of the network-aware service placement 156, resulting in additional network-aware service placement occurring at circles '6A' and '6B'. This can continue through the hierarchy toward the leaf agents 108 in somewhat of a recursive manner until the leaf agents are reached.

For example, at a last intermediate level of agents (see, e.g., intermediate agent 106D) when the network-aware service placement 160 concludes (at circle '7'), one or more service placement solutions 162A-162B (at circles '8A' and '8B') can be sent to the leaf agents 108A-108C. In response, each leaf agent 108A-108C need not perform network-aware service placement operations, but instead can, in some embodiments, simply reserve/allocate resources 114 according to the service placement solutions 162A-162B. For example, a leaf agent 108A can cause its corresponding electronic device 110H to reserve resources (memory, storage, processing time, etc.) for the application, spin up a VM for the application, etc.

For further detail regarding one potential setup for implementing network-aware service placement, FIG. 5 also includes pseudocode 520 illustrating high-level operations. Accordingly, "real" code similar to this pseudocode 520 could, for example, be executed at every agent in the hierarchy of agents.

Figure 6:
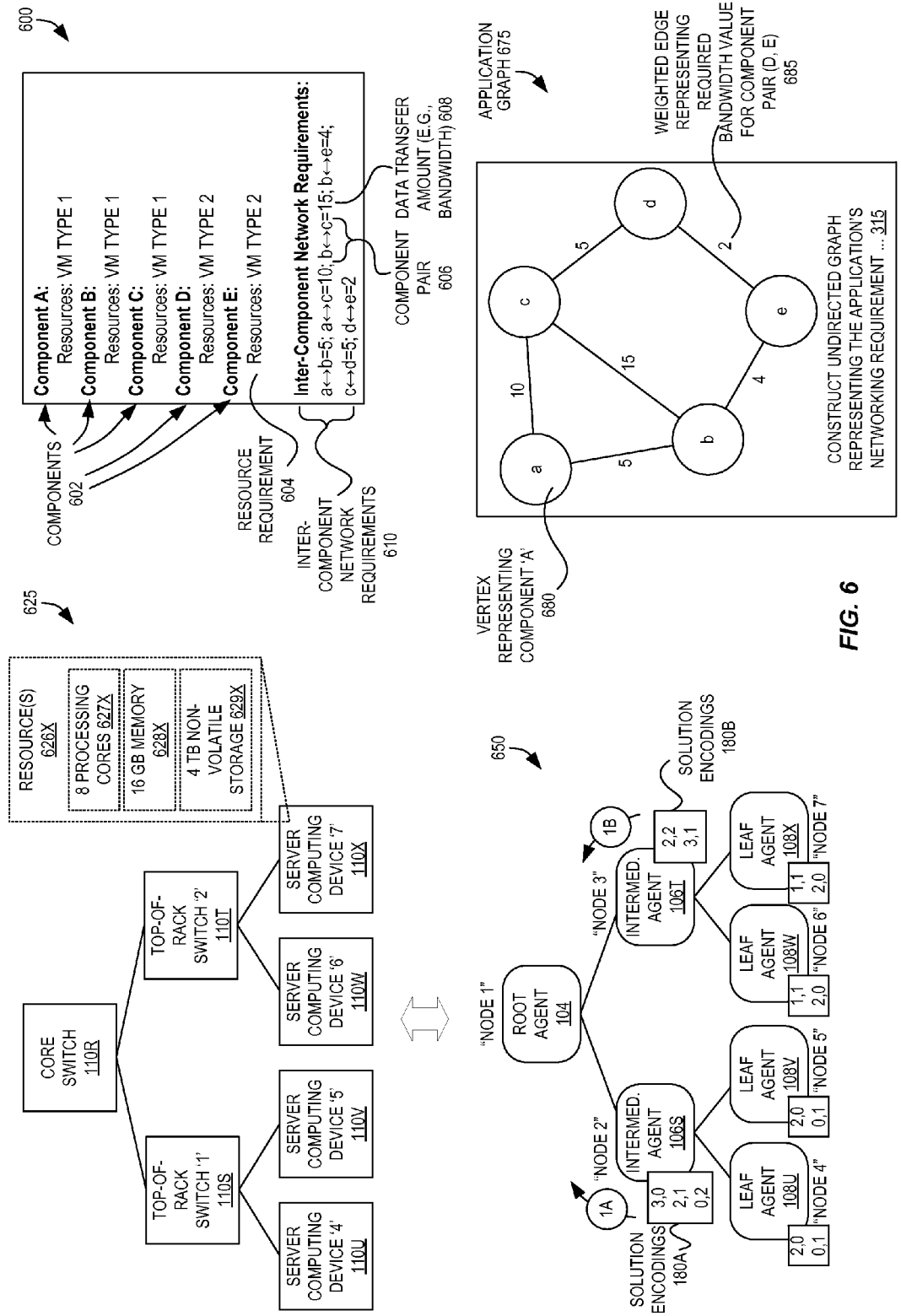
FIG. 6 includes several block diagrams illustrating an exemplary configuration of physical cloud resources, a mapping thereof to a hierarchy of agents, an exemplary service request including inter-component network requirements, and an application graph according to some embodiments.
Figure 7:
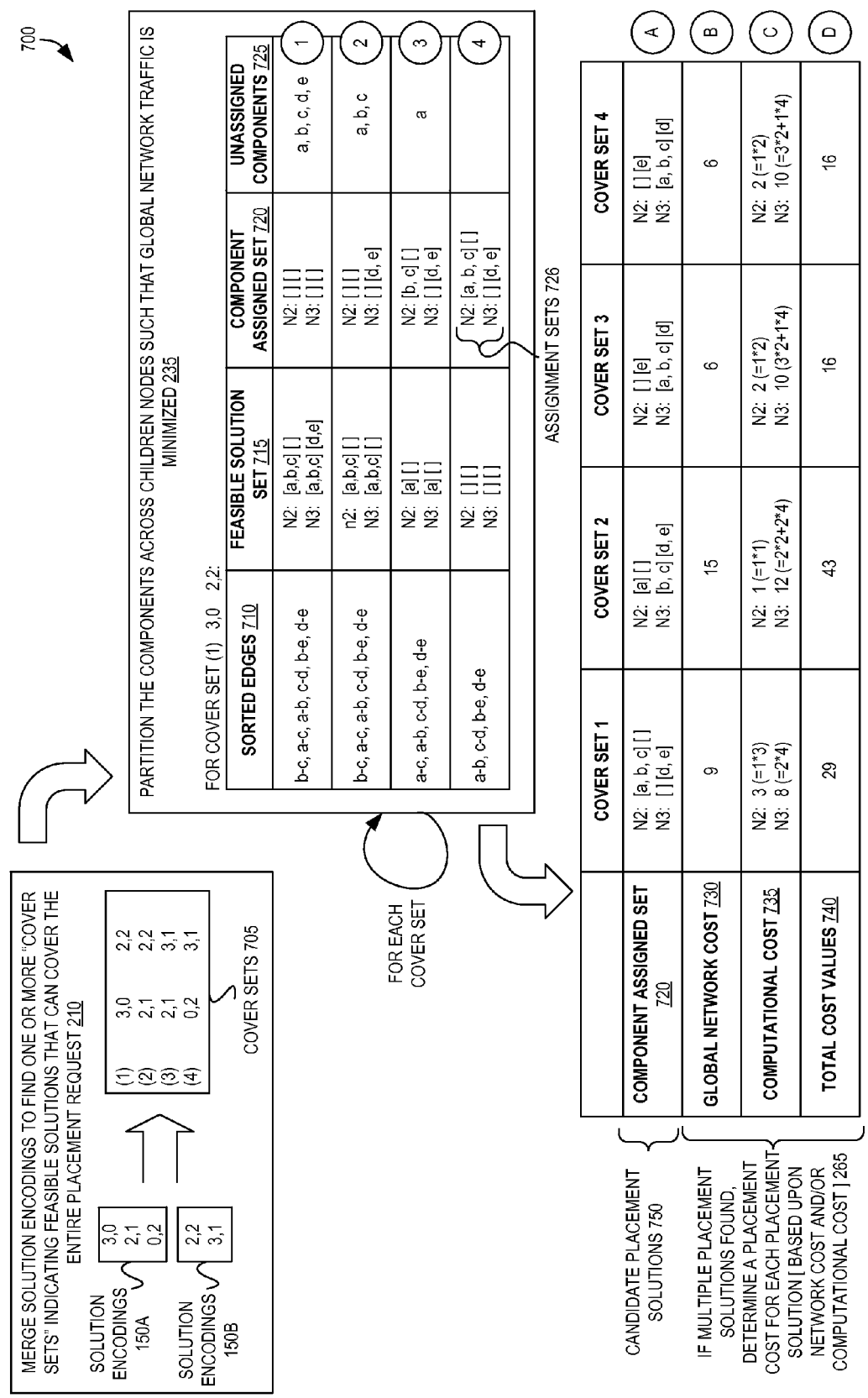
FIG. 7 includes several block diagrams illustrating solution encoding merging, component-partitioning, and resulting cover set costs generated as part of network-aware service placement according to some embodiments.

To assist in understanding, FIG. 6 and FIG. 7 will be referred to in order to present a more specific example network-aware service placement. FIG. 6 includes several block diagrams illustrating an exemplary configuration of physical cloud resources 625, a logical tree 650 including a hierarchy of agents, an exemplary service request 600 including inter-component network requirements 610, and an application graph 675 according to some embodiments.

For the sake of this example, we assume a simple example of a 2-tier data center with four server computing devices 110U-110X, two TOR switches 110S-110T, and one core switch 110R that connects the servers as a tree, as illustrated as physical cloud resources 625.

Accordingly, a logical tree 650 can be generated as a one-to-one mapping of the data center architecture, that is, one agent per physical node (servers or switches) although as described herein, a one-to-one mapping is not required.

We will also consider a service request 600 with 5 tasks/components 602 and an application graph 675 as illustrated. The service request 600 identifies, for each of the components, a set of resources required for the component—here, a "type" of VM. In this example, three of the components (i.e., components A, B, and C) require VMs of type one and two of the components (i.e., components D and E) require VMs of type two. The service request 600 also includes inter-component network requirements 610, which indicates pairs 606 of components and a data transfer amount 608 (e.g., one-way or two-way bandwidth) for each pair. Based upon the service request 600, application graph 675 can be generated to include five vertices (e.g., vertex 680 for component A) for the five components 602 that are connected with weighted edges 685 based upon the inter-component network requirements 610.

We also assume that the physical characteristics of the server computing devices 110U-110X under each of the TOR switches 110S-110T are different and can provide VMs with different costs. For server computing devices 110U-110V, for example, $CompCost_{41}=CompCost_{51}=1$ (i.e., computation cost for each of server computing device '4' and '5' to provide VM type 1 is 1) and $CompCost_{42}=CompCost_{52}=2$.

Additionally, for server computing devices 6 and 7 (110W-110X), we assume that $CompCost_{61}=CompCost_{71}=2$ and $CompCost_{62}=CompCost_{72}=4$. Accordingly, the cost to place a VM of either type one or type 2 is double on either of service computing devices 110W-110X when compared to service computing devices 110U-110V.

Once the initial service placement request has been submitted, the agents can calculate their feasible solution sets using techniques as described below (i.e., phase one), and then use the techniques described above to perform the network-aware placement (i.e., phase two).

In this example, we will make reference to FIG. 7, includes several block diagrams illustrating solution encoding merging 210, component-partitioning 235, and resulting cover set cost generation as part of network-aware service placement according to some embodiments.

Phase One: Feasible Solution Exploration. Using the techniques described below, we get the feasible solutions for this example by first encoding the service request according to the resource and affinity requirements. The service request given in the example does not have any affinity requirements, though it requires three VMs of type one to host components 'a', 'b' and 'c', and two VMs of type two to host components 'e' and 'd'. The service request is therefore encoded as [3, 2]. The following table shows the feasible solutions for server computing devices 4, 5, 6, and 7.

| Feasible solutions of servers (nodes 4, 5, 6, and 7) | Feasible solutions at TOR level (nodes 2 and 3) | Feasible solutions at core switch level |
|---|---|---|
| Feasible solutions of node 4<br>2, 0<br>0, 1 | Feasible solutions of node 2<br>3, 0<br>2, 1<br>0, 2 | Feasible solutions of node 1<br>3, 2<br>3, 1 |
| Feasible solutions of node 5<br>2, 0<br>0, 1 | | |
| Feasible solutions of 6<br>1, 1<br>2, 0 | Feasible solutions of node 3<br>2, 2<br>3, 1 | |
| Feasible solutions of 7<br>1, 1<br>2, 0 | | |

From the table it can be seen that server computing device '4' (110U) either can host two VMs of type one, or one VM of type two. In some embodiments, all agents in the logical tree can get the feasible solutions that the servers under their control can afford as shown by the table (e.g., intermediate agent 106S merges the solution encodings of leaf agents 108U-108V, intermediate agent 106T merges the feasible solutions of leaf agents 108W-108X, and root agent 104 merges the solution encodings 180A-180B of intermediate agents 106S-106T). Given that each agent sends all combination of feasible solutions it can afford (e.g., solution encodings 150A-150B), the merging of two solutions can occur by taking a Cartesian product of the solution sets. The merged result can, in some embodiments, be compacted by removing any redundant solutions and/or removing solutions that are subsets of the other solutions.

Phase 2: Network-Aware Service Placement Solution Selection. Once the root agent 104 finds that a feasible solution does exist (meaning that agents under its control can afford the request, in this example [3, 2]), it can initiate phase 2.

First, the agent can first find a sufficient number of cover sets 705, i.e., a set of solutions from children, whose combination covers the entire request. For example, in the root agent 104, the combination of the solution [3,0] from intermediate agent 106S and [2,2] from intermediate agent 106T makes a cover set. Similarly all the cover sets 705 at root agent 104 can be found as follows:

Cover set 1: node 2: [3,0], node 3: [2,2]
Cover set 2: node 2: [2,1], node 3: [2,2]
Cover set 3: node 2: [2,1], node 3: [3,1]
Cover set 4: node 2: [0,2], node 3: [3,1]

Then, for every cover-set, the root agent 104 can perform the network-aware component placement flow 300 in order to find the service placement solution across its children (i.e., partitioning the service over intermediate agents 106S-106T) which is provided in detail as follows:

As given in the table below and reflected in FIG. 7, the root agent 104 can sort the edges 710 of the service, mark all components as unassigned 725, and find the component_assigned_set 720 of the children nodes. The feasible_solu tion_set 715 for every agent specifies the maximum number of components for a group that the agent can afford, and the identity of components in that group. For instance, node 2 can host three of the components that require VM type one, i.e., [a, b, c]. Similarly, node 3 can host two of tasks of VM type one, i.e., [a, b, c] and two tasks of VM type two, i.e., [d, e]. Also, component_assigned_set for every node specifies which component in a given group is assigned to which node. Accordingly, the process begins at circle '1' of the figure:

| Sorted edges | Feasible_solution_set | Component_assigned_set | Unassigned components |
|---|---|---|---|
| (b, c), (a, c), (a, b), (b, e), (c, d), (d, e) | Node 2: 3, [a, b, c] and 0, [ ]<br>Node 3: 2, [a, b, c] and 2, [d, e] | | [a, b, c, d, e] |

Next, the agent finds all the tasks that only have one placement choice. In this example, components D and E can only be placed on node 3 (intermediate agent 106T). Therefore, the values are updated as follows at circle '2':

| Sorted edges | Feasible_solution_set | Component_assigned_set | Unassigned components |
|---|---|---|---|
| (b, c), (a, c), (a, b), (b, e), (c, d) | Node 2: 3, [a, b, c] and 0, [ ]<br>Node 3: 2, [a, b, c] and 0, [ ] | Node 2: [ ], [ ]<br>Node 3: [ ], [d, e] | [a, b, c] |

Next, the sorted edges can be processed one by one in a loop. For example, first edge (b, c) is picked. Thus, S, the common placement candidates for b and c is equal to [node 2, node 3].

In order to find the best candidate, the LOCALNET flow 400 can be used to calculate LOCALNET((b, c), node 2) and LOCALNET((b,c), node 3). From the application graph 675, it can be seen that if both components b and c are hosted by node 2, there is a potential to localize link (a, c)=10 and link (a, b)=5. Therefore, LOCALNET((b,c), node 2)=15. Similarly, if (b,c) is hosted by node 3, the links (b,d) and (c,d) will be localized, which results in LOCALNET((b,c), node 3)=9. Therefore, node 2 is selected to host tasks b and c, and the table is updated as below at circle '3':

| Sorted edges | Feasible_solution_set | Component_assigned_set | Unassigned components |
|---|---|---|---|
| (a, c), (a, b), (c, d), (b, e) | Node 2: 1, [a] and 0, [ ]<br>Node 3: 2, [a] and 0, [ ] | Node 2: [b, c], [ ]<br>Node 3: [ ], [d, e] | [a] |

Next, edge (a,c) is picked. The common candidate of (a,c)={node 2}. Therefore component A is assigned to node 2 and the table is updated at circle '4':

| Sorted edges | Feasible_solution_set | Component_assigned_set | Unassigned components |
|---|---|---|---|
| (a, c), (a, b), (b, e), (c, d) | Node 2: 0, [ ] and 0, [ ]<br>Node 3: 2, [ ] and 0, [ ] | Node 2: [a, b, c], [ ]<br>Node 3: [ ], [d, e] | [ ] |

Since there are no unassigned components left, the process halts for the first cover set. Similarly, the network-aware placement solutions can be calculated for Cover_set 2, Cover_set 3, and Cover_set 4 to find the component_assigned_set candidate solutions as follows at circle 'A':

| | CS1 | CS2 | CS3 | CS4 |
|---|---|---|---|---|
| Component_assigned_set | Node 2: [a, b, c], [ ]<br>Node 3: [ ], [d, e] | Node 2: [a], [ ]<br>Node 3: [b, c], [d, e] | Node 2: [ ], [e]<br>Node 3: [a, b, c], [d] | Node 2: [ ], [e]<br>Node 3: [a, b, c], [d] |

|  | CS1 | CS2 | CS3 | CS4 |
| --- | --- | --- | --- | --- |
| Global network | 9 | 15 | 6 | 6 |
| Computation Cost | Node 2: 3 | Node 2: 1 | Node 2: 2 | Node 2: 2 |
|  | Node 3: 8 | Node 3: 12 | Node 3: 10 | Node 3: 10 |
| Total_Cost | 29 | 43 | 16 | 16 |

Next, the "Total_Cost" for all of the candidate placement solutions 750 can be calculated to aid in selecting the best placement solution at circle 'B'.

First, the global data transfer rate (or global network cost 730) across children nodes for each solution can be calculated, that is, the total data transfer rate across children nodes for a given solution. For instance, for the solution of Cover_set_1, links (c-d) and (b-e) become "global" (i.e., are inter-node links), which incur 9 units of global network traffic between nodes 2 and 3.

Similarly, the computation cost of each solution can be calculated at circle 'C'. For example, the computation cost of Cover_set_1 solution, which uses three VMs of type one from node 1 and two VMs of type two from node 3 becomes 11 (note that $CompCost_{21}=1$ and $CompCost_{32}=4$, so the cost is equal to 1*3+2*4, or 11).

Finally, the Total_Cost per each solution can be calculated at circle 'D' using, for example, the total placement cost function 510 of FIG. 5. In this example, we assume $\alpha=2$ and $\beta=1$. Plugging the network and computation costs into the function 510, the solution of cover_set_3 and cover_set_4 (which are the same) can be determined to provide the best solution, as these share a smallest Total_Cost value. Therefore, the root node can send the service placement solutions (or "service queries") of ([ ],[e]) to node 2, and ([a,b,c],[d]) to node 3.

Thereafter, both node 2 and node 3 can go through the same process of that of node 1 to find the best placement across their children as follows:

For Node 2: Node 2 first finds enough number of cover sets that can cover the given query, and finds the following cover sets:

Cover_set_1: node 3: [0,1] and node 4: [0,0]

Cover_set_2: node 3: [0,0] and node 4: [0,1]

Next, as the edge set is empty and the computation cost of node 4 and node 5 are equal, the agent can chooses either node 4 or node 5 (e.g., randomly or according to a configured selection scheme). We assume that node 4 is chosen, and then node 2 sends the service placement solution (or service query) of ([ ] [e]) to node 4.

For Node 3: Node 3 first finds the cover sets for its query ([a,b,c][d]) as follows:

Cover_set 1: node 6: [1,1], node 7: [2,0]

Cover_set 2: node 6: [2,0], node 7: [1,1]

Because both Cover_set 1 and 2 are complements of one another and the computation cost of node 5 and node 6 is equal, it is sufficient to solve for only one of them. We solve it for Cover_set_1. Thus, the parameters are initialized as follows (noting that since task D has only one placement choice, it will be assigned to node 6 at the first step).

| Sorted edges | Feasible_solution_set | Component_assigned_set | Unassigned components |
| --- | --- | --- | --- |
| (b, c), (a, c), | Node 6: 1, [a, b, c] and 0, [ ] | Node 6: [ ], [d] | [a, b, c] |
| (a, b), (c, d) | Node 7: 2, [a, b, c] and 0, [ ] | Node 7: [ ], [ ] |  |

First, edge (b,c) is picked. The common candidate for (b,c) is as follows, S=[node 6] (please note that since node 6 can only host either of components 'b' or 'c', it is not a placement candidate for edge (b,c)):

| Sorted edges | Feasible_solution_set | Component_assigned_set | Unassigned components |
| --- | --- | --- | --- |
| (a, c), (a, b), | Node 6: 1, [a] and 0, [ ] | Node 6: [ ], [d] | [a] |
| (c, d) | Node 7: 0, [ ] and 0, [ ] | Node 7: [b, c], [ ] |  |

Next, component A has only one placement choice, which is assigned as follows:

| Sorted edges | Feasible_solution_set | Component_assigned_set | Unassigned components |
| --- | --- | --- | --- |
| (a, c), (a, b), | Node 6: 0, [ ] and 0, [ ] | Node 6: [a], [d] | [ ] |
| (c, d) | Node 7: 0, [ ] and 0, [ ] | Node 7: [b, c], [ ] |  |

For nodes 4, 6 and 7: At the leaf level, Nodes 4, 6, and 7 receive the service placement solutions (or service queries) ([ ][e]), ([a][d]), and ([b,c],[ ]), respectively. The agents can then allocate the resources accordingly.

As described herein, embodiments are well-suited for use on a cloud hierarchal architecture and its corresponding resource tree. At each level of the hierarchy, embodiments can intelligently partition the components of the service request such that connected components with heavy network bandwidth will tend to reside on the same sub-tree as much as possible in order to localize the network traffic. Thus, as the complexity of these embodiments depends upon the application graph and the on cloud resource tree structure rather than the total number of servers and the network graph among them, embodiments are highly scalable for use in a large-scale cloud. Further, embodiments can make efficient use of network resources without requiring access to real-time network information at any central location.

As described above, there are many different ways to acquire solution encodings to launch the network-aware service placement scheme provided herein. One example is provided below with regard to FIG. 8, which is a high-level block diagram illustrating one possible exemplary scheme for generating service placement solution encodings to be used for decentralized network-aware service placement across one or more data centers according to some embodiments.

Figure 8:
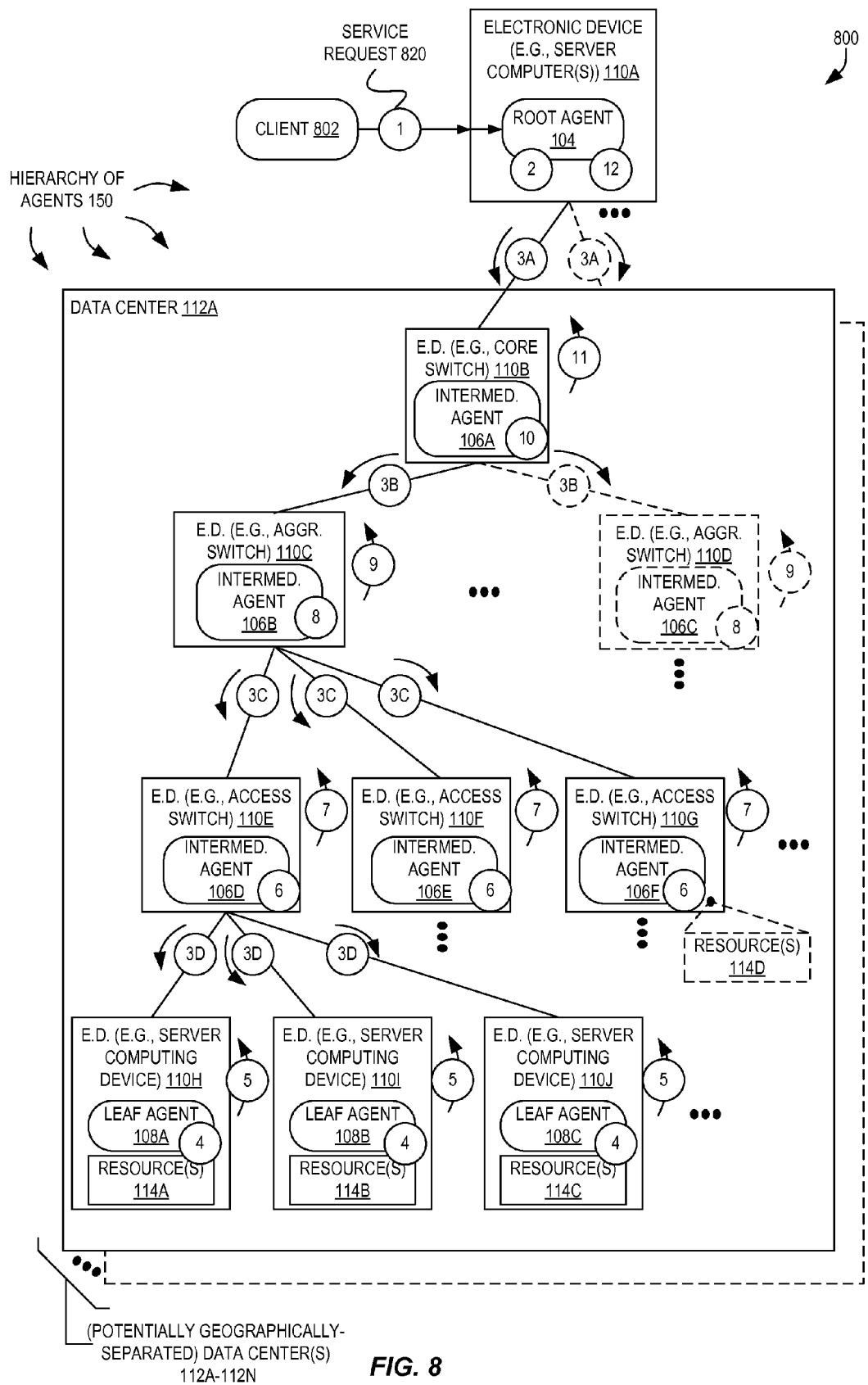
FIG. 8 is a high-level block diagram illustrating one possible exemplary scheme for generating service placement solution encodings to be used for decentralized network-aware service placement across one or more data centers according to some embodiments.

In FIG. 8, a client 802 provides a service request 820 at circle '1', that is ultimately received (e.g., directly from client 802, or indirectly via another entity) at the root agent 104 at circle '2'. The root agent 104 can comprise a software module (e.g., an application, a process, a virtual machine) executed by an electronic device 110A such as a server computing device. The service request 820, in some embodiments, can be received from a user acting on the behalf of a cloud tenant, or another subsystem in the cloud. In some embodiments, a client 802 issues a request via a web portal or Application Programming Interface (API) (such as a Web Service), and the service request 820 can thus be provided to the root agent 104 by the web portal or API endpoint. In other embodiments, the client 802 can be a software module that issues the service request 820 programmatically, and thus, the service request 820 need not be directly caused to be issued by a human.

The service request 820, in some embodiments, includes a specification of the requirements of all resources needed by (or requested for) the desired service. For example, the service request 820 can include a description of a required processing resource units (e.g., a number of CPU cores, a number of encryption processors, a number of Graphics Processor Units (GPUs)), an amount of memory, an amount of storage, a number of network interface units (e.g., physical ports, virtual ports, etc.) each component of the service requires.

In some embodiments the service request 820 can include requirements about allowed or prohibited geographical locations for some or all of the components to be deployed, and in some embodiments can include affinity constraints for the components. An affinity constraint can specify particular components of the service that must be placed together on one set of computing resources, and/or particular components that are not to be placed together. Further, in some embodiments, an affinity constraint can identify one or more of the components of the service that are not to be placed in particular execution environments. For example, an affinity constraint can specify that one or more of the components are not to be placed on hardware shared with a database server—regardless of whether it is part of the same service or not. As another example, an affinity constraint can specify that one or more of the service's components are not be placed on hardware shared by a particular other entity or organization (e.g., a competitor) or type thereof. Of course, these embodiments are not limited to these exact described types of resource requirements and service requests, and thus these examples are not to be viewed as limiting but rather as illustrative.

Upon receipt of a service request 820, the distributed service placement can include several phases. For example, in some embodiments, the placement includes four phases: (1) service request encoding and distribution, (2) feasible solutions exploration, (3) solution aggregation, and (4) final solution selection. In some embodiments, all agents in the hierarchy 150 can be configured to perform the four phases, and thus, the phases can be recursively applied at every agent in the resource tree, starting with the root agent 104. However, in some embodiments, only certain phases are performed by certain of the agents in the hierarchy 150 based upon the particular configured role of the agent. For example, in some embodiments a root agent 104 may perform only certain phases, an intermediate agent 106 may perform only certain ones of the phases, and/or a leaf agent 108 may perform only certain ones of the phases.

In the exemplary embodiment of FIG. 8, upon the service request 820 being received at circle '2' at the root agent 104 of the hierarchy 150, the first phase—"service request encoding and distribution"—begins with the received service request 820 being divided into two parts: basic resource requirements, and location and/or affinity requirements.

Additionally, in some embodiments the service request 820 can be assigned a unique request identifier in order to allow for services requests 120 to later be uniquely associated with solutions. For example, the use of service request identifiers can simplify, for example, handling solutions that are received late. The service request identifier can be a unique random number, a request sequence number, a value resulting from a hash function (or other one-way or two-way function) being applied to some or all data of the service request, or can be chosen by any other scheme easily selected by one of ordinary skill in the art.

In some embodiments, during phase one and represented at each circle '3A', if the agent is configured as a root agent 104 or an intermediate agent 106 it can distribute the service request 820 (or a derivation thereof, referred to herein and described later as a service request description) to one or more agents of the hierarchy 150 configured as its children. This distribution may be selective and occur, for example, depending on location requirements of the service request and the known locations of the computing resources associated with the sub-hierarchy of agents. For example, if a request has a location requirement stating that all resources must be located in Europe, the agent can be configured to not pass the service request 820 to children agents placed in North America.

Additionally, as indicated above, in some embodiments the data sent at circle '3A' can include that of multiple service requests 120 from one or more clients 102, which the system can attempt to place in parallel in somewhat of a "batch" manner. In some embodiments, multiple service requests can be easily bundled together as separate equivalence classes (e.g., each of which having its own sub-equivalence classes like affinity, colocation, and resource groups) of a single large query that can be processed and placed partially or as a whole.

In some embodiments, an intermediate agent 106 receiving a service request 820 from an agent "above" it in the hierarchy (i.e., an agent serving as a parent agent to it), the intermediate agent 106 may be configured to identify (or derive) the service request identifier, which in some embodiments it may persist or maintain in memory. In some embodiments, the intermediate agent 106 may also selectively determine which, if any, of its child agents (e.g., intermediate agents 106B-106C for intermediate agent 106A, intermediate agents 106D-106F for intermediate agent 106B, or leaf agents 108A-108C for intermediate agent 106D) that it will pass the service request 820 to. For clarity of explanation with regard to this illustrated embodiment, we assume that the service request 820 will be passed to all agents in the hierarchy 150; thus, at each circle '3B' the service request 820 is passed down to intermediate agents 106B-106C, at each circle '3C' the service request 820 is passed down to intermediate agents 106D-106F, and at each circle '3D' the service request 820 is passed down to leaf agents 108A-108C.

When a leaf agent 108 receives the service request at circle '4', in some embodiments it will perform phase (1) operations, and can first extract a pattern from the service request 820 that categorizes the components in the request to equivalence classes. In some embodiments where each agent is using the same pattern extraction logic, these patterns will be identical across all leaf agents 108. Equivalence classes of the pattern can be formed based on affinity requirements and resource requirement commonalities. In some embodiments, each equivalence class is then associated with a certain position in some data structure, for example, a position in a tuple or in a list. In some embodiments, though, each equivalence class can be assigned and associated with a unique identifier that is used to reference the equivalent class. Accordingly, the equivalence classes in the extracted pattern can be utilized to encode the resource requirements and affinities associated with different components of the request. Thus, these embodiments classify and encode the service requests as a whole in a way that allows for very efficient handling in all search phases.

In phase (2), each leaf agent 108 searches the partial solutions of the input request placement that can be afforded by its available resources 114, without compromising any stated affinity requirements. Finding the feasible partial solutions can include searching through all the subsets of the service request 820. Note that the power set, representing all the subsets of a service request 820, grows exponentially in the number and types of the equivalent classes or components of the request.

However, the leaf agents 108 can be configured to perform an efficient search by leveraging the anti-monotonicity property, also known as apriori or downward-closure property. This property guarantees that for any feasible partial solution of the request, all its subsets are also feasible. Therefore, every leaf agent 108 can be configured to find a set of feasible partial solutions such that no two solutions are subsets of each other, and all partial solutions comply with the affinity requirements. Each partial solution found by a leaf agent 108 is encoded as the number of components that can be placed from each equivalence class. This results in a more compact representation of the set of feasible partial solutions, which can be returned to the leaf agent's parent at each illustrated circle '5'. Notably, the encodings as representations of the feasible solutions have a set of key mathematical properties that can be leveraged during the following phases.

In phase (3)—at circles '6' and '8' and '10' and '12'—every parent agent receives the feasible partial solutions in the form of encodings from its children, and may temporarily store the solutions, merge the received solutions in order to obtain the feasible partial solutions that can be met by all of the children, and finally return the solutions to its parent, if one exists (e.g., at circles '7' and '9' and '11').

In some embodiments, agents acting as a root agent 104 or intermediate agent 106 can be configured to utilize a preset timeout value indicating an amount of time that it will wait for its child agents to return their encodings to create a timeout window. Accordingly, if this time window expires and some child agents have failed to reply with their encodings, the root agent 104 or intermediate agent 106 can be configured to proceed with merging what it has received, which can prevent dead locks in the system.

Additionally, in some embodiments the root agent 104 or the intermediate agent 106 may also be configured to "re-query" those of its child agents that failed to reply within the timeout window. Accordingly, in some embodiments, the agents can be configured to, upon failing to receive encodings from one or more of its child agents within the timeout window, re-query that child agent(s), restart the timeout window, and await the encodings. The agents may be configured to perform a re-query a preset number of times (e.g., 0 times, 1 time, 2 times, etc.).

In some embodiments, the merging is performed by the agent incrementally and according to the apriori property of the encodings, which produces very compact results. For example, the incremental merging can include merging the feasible partial solutions of the two first children. Next, the redundant partial solutions whose superset already exists in the results can all be deleted. Similarly, the procedure may repeat, where the results are again merged with the feasible partial solutions provided by all other children.

In some embodiments, an agent finding a complete solution can return the solution directly to the root agent 104. In some embodiments, the agent may instead pass the complete solution to its parent. If the root agent 104 is reached and no solution is found, it is certain that no feasible solution to the service request exists, and a true negative answer is reached. Otherwise, the process can continue with phase (4).

In phase (4)—e.g., circle '12'—the found solutions can be identified and used to determine a preferred placement solution. This can occur, for example, using the techniques described above with regard to FIGS. 1-7.

Figure 9:
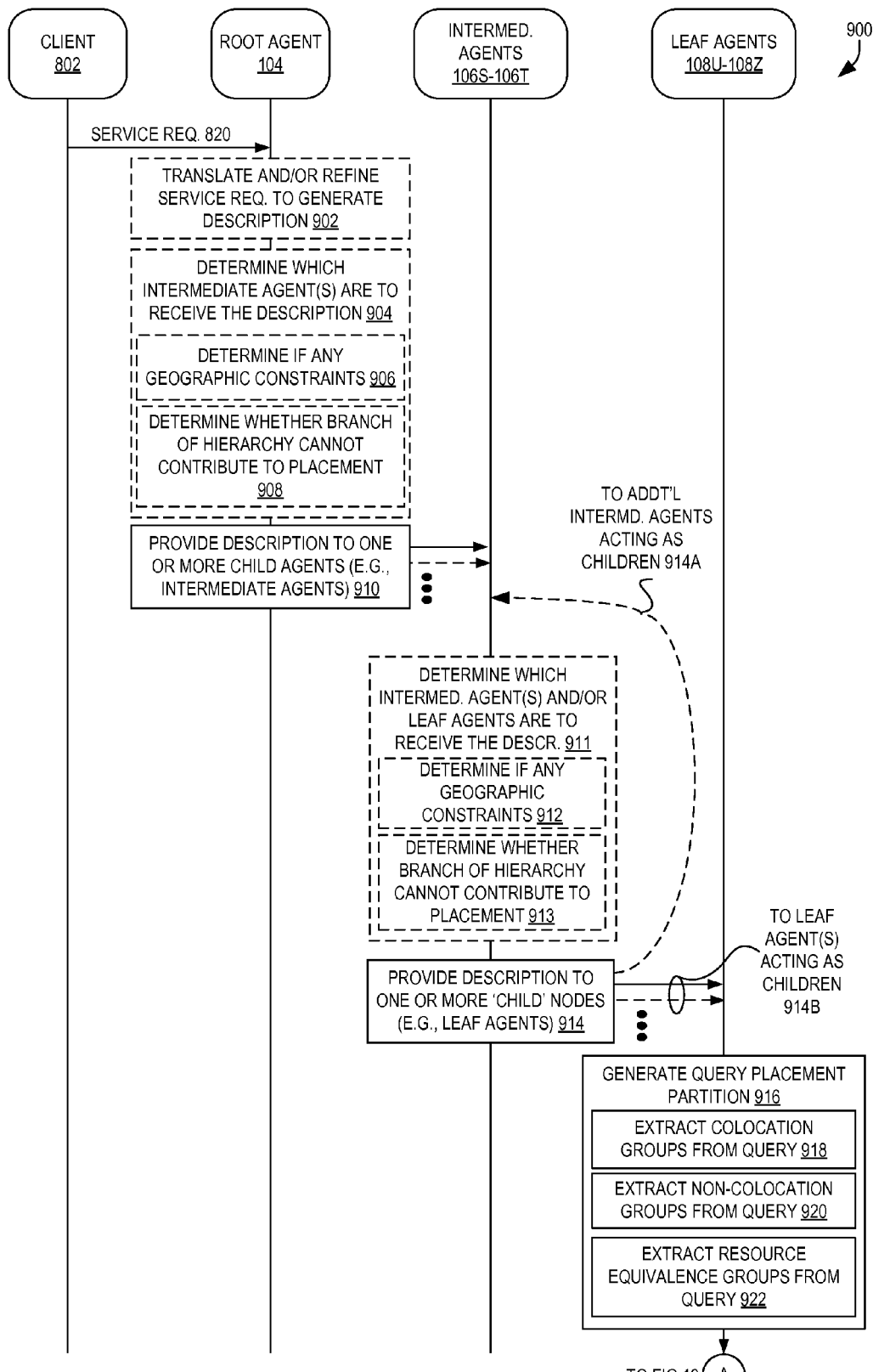
FIG. 9 is a combined sequence and flow diagram illustrating some operations for generating service placement solution encodings according to some embodiments.

To explore the exemplary decentralized service placement example, we turn to FIG. 9, which presents a combined sequence and flow diagram illustrating message flows between and operations performed by a client 802, root agent 104, intermediate agents 106S-106T, and leaf agents 108U-108X for performing decentralized service placement according to some embodiments.

In this example, the client 802 provides a service request 820, which arrives at root agent 104 directly or via another entity (e.g., a web portal, API endpoint, etc.). In some embodiments, the root agent 104 will optionally (at block 902) translate and/or refine the service request to generate a service request description.

In some embodiments, block 902 can include transforming a textual service request 820A into a service request description according to a machine-friendly format. For example, the data of the textual service request can be written according to the following format as a service request description, where C stands for a component identifier:

<C>: requirements={Cores, Memory, Storage}, colocations={<C>}, non-colocations={<C>}

The service request description can also include formatted data representing the network requirements and interconnectivity for the components in a variety of formats (not illustrated herein), as illustrated by inter-component network requirements 610 of FIG. 6. However, the service request description of the textual service query given above could be denoted as:

1: {2,4,1}, {2}, {4,5,6}
2: {2,4,1}, { }, { }
3: {1,1,1}, { }, {1,4,5,6}
4: {1,2,2}, { }, { }
5: {1,4,2}, { }, { }
6: {1,4,2}, { }, { }

As can be seen, the affinity symmetry with respect to colocation and non-colocation may not be provided in the service request description. Thus, in some embodiments, the service request description can be refined in order to reflect the necessary symmetry. For instance, Component 1 having to be on the same physical machine with Component 2 also implies that Component 2 must be on the same machine as Component 1. The same two-way implication (or "iff" relation) also applies to non-colocation. Also, Component 2 must also inherit all non-colocation constraints of Component 1 and vice versa. Further, each component that has Component 1 as a non-colocation constraint can be updated to have Component 2 as a non-colocation constraint as well. Once the symmetry is attained, the refined service request description is:

1: {2,4,1}, {2}, {3,4,5,6}
2: {2,4,1}, {1}, {3,4,5,6}
3: {1,1,1}, { }, {1,2,4,5,6}
4: {1,2,2}, { }, {1,2,3}
5: {1,4,2}, { }, {1,2,3}
6: {1,4,2}, { }, {1,2,3}

Turning back to FIG. 9, the flow can continue with the root agent 104 optionally determining, at block 904, which intermediate agent(s) are to receive the service request description (120A, 120B, or 120C). For example, in some embodiments, the root agent 104 can determine, at block 906, whether the service request 820 includes a geographic constraint indicating physical (or virtual) locations where one or more (or all) components of the requested service may or may not be placed. For example, a constraint for a service request 820 could specify that all components of a service must be placed within North America, or that two of the components of a service must not be placed within either Germany or the state of Texas.

Block 904 can also include determining, at block 908, whether a particular branch of the hierarchy cannot contribute to a placement of some or all of the components of the service request 820. For example, a root agent 104 may be configured with data specifying geographic locations associated with each of its child agents (e.g., intermediate agents 106S-106T). The root agent 104 can then, perhaps based upon a geographic constraint of the service request 820, determine whether one (or more) of its child agents can be skipped (or "pruned") from the distributed service placement due to that child agent—and its descendent agents—being unable to provide any assistance with the placement. Continuing the preceding example where all components of service must be placed within North America (per a geographic constraint of the service request 820), it could be the case where a first child agent (e.g., intermediate agent 106S) serves as a "root" of a sub-tree of agents for North America, and the second child agent (e.g., intermediate agent 106T) serves as a "root" of a sub-tree of agents for Europe. In this case, the root agent 104 can determine that only the first child agent is to receive the service request description, and that the second child agent is not to receive the service request description.

Notably, it is also possible that at block 904, the root agent 104 could determine that none of its child agents should be recipients. For example, the root agent 104 could determine that a constraint provided with a service request 820 eliminates all of the sub-trees associated with each of its child agents from being placement candidates. Thus, in some embodiments the root agent 104 can determine that it is unable to accommodate the service request 820, and possibly report this failure back to the client 802 and end the flow.

However, in some embodiments the root agent 104 provides, at block 910, the service request description to some or all of its child agents. In some embodiments, the root agent 104 can provide the service request description to all of its child agents, but in some embodiments, the root agent 104 may potentially provide the service request description to a subset of its child agents—e.g., those agents determined to be recipients per block 904.

Optionally, each of the intermediate agents 106S-106T can be configured to, at block 911, determine which of its child agents (e.g., additional intermediate agents or leaf agents) are to receive the description. Block 911 can include similar operations as described with regard to block 904—thus, the intermediate agents 106S-106T can optionally, at block 912, determine if there are any geographic constraints associated with the service request 820, and optionally at block 913 determine whether a branch (or sub-tree) of the hierarchy associated with one or more of its children agents cannot contribute to any placement of any of the components of the service request.

Accordingly, the intermediate agents 106S-106T may or may not provide the service request description (at block 914) to all of its child agents based upon the operations of block 911. In embodiments where there are multiple levels of intermediate agents, some or all of the intermediate agents 106S-106T may pass the service request description to additional intermediate agents acting as children agents at line 914A. In some embodiments, the intermediate agents 106S-106T pass the service request description to leaf agents 108U-108Z at line 914B.

Although not illustrated, in some embodiments the leaf agents 108U-108Z can also perform operations similar to those disclosed with regard to blocks 904 and 911, which can allow the particular leaf agents 108U-108Z to determine whether they should even attempt to determine which solutions, if any, they can provide. For example, if a geographic constraint indicates that no component should be placed in the United States, and the particular agent is associated with resources within that country, the agent can be configured to avoid further solution searching and instead report back (to its parent agent, to a root agent, etc.) that it cannot provide any solutions without having to examine the particular resource requirements of the requested service.

However, continuing with the flow, we now step to block 916, in which the leaf agents 108U-108Z utilize the service request description to determine a representation of all possible solutions that the associated computing resources (e.g., a server computing device) can provide in hosting the service request in part or in full. Note that, if it can be ensured that the representations of each agent's solution space is compatible (meaning they follow the same pattern), then it will be possible to merge these generic descriptions quickly up the network. In order to ensure that these are compatible representations, the agents can be configured to tightly stick with the data given by the service request description as it will reach and be common to every leaf agent. Accordingly, in some embodiments the shared service request description and a common logic (implemented at each agent) can be used to extract a common pattern for solution representations. This pattern can be common to all agents in the hierarchy throughout the resolution of the placement query. Accordingly, this process can be viewed as a common protocol used to articulate how each individual resource unit can assist in solving the placement problem.

In some embodiments, block 916 is performed to first generate a query placement partition. In some embodiments, this includes extracting colocation groups from the service request description (or "query") at block 918, extracting non-colocation groups from the query at block 920, and/or extracting resource equivalence groups from the query at block 922.

Query placement partition generation can begin with extracting 918 colocation groups, each of which identifies a grouping of components that are to be executed together (i.e., be "colocated"). In the ongoing example, we assume there is a single colocation group with Component 1 and Component 2, as the constraints of the first component indicate "Must be co-located with Component 2". For convenience, we can denote this group using the following format, where the term "components" denotes the set of identifiers of the components in the colocation group, and the term "non-colocations" denotes the set of identifiers of components than cannot be colocated with the components in the colocation group:
{components={1,2}, non-colocations={3,4,5,6}, type=0}

A colocation group can be defined as a set of components where the union of each component's colocation constraints is identical to the colocation group itself. In the example, we also use "type=0" as a flag indicating that this is a colocation group and the components in it must either be placed all together or not at all. Of course, this flag and this particular notation need not be precisely followed in all embodiments.

Query placement partition generation can also include extracting 920 non-colocation groups. This can occur by identifying, from the components remaining in the query after the extraction of colocation groups, sets of components that have the same set of non-colocation constraints. Accordingly, our example query has two non-colocation groups:
{components={3}, non-colocations={1,2,4,5,6}, type=1}
{components={4,5,6}, non-colocations={1,2,3}, type=1}

Once again, "type=1" indicates that these are non-colocation groups, and thus, the components in them can be placed in any quantity. This first non-colocation group is for component 3, which has constraints indicating that it cannot be co-located with any of components 1, 2, 4, 5, or 6. The second non-colocation group is for components 4, 5, 6, each of which having a same set of non-colocation constraints (i.e., no component-specified co-colocation constraints, but each having inherited co-location constraints due to the non-colocation constraints of components 1 (and inherited by 2) and 3). Thus, each of components 4, 5, and 6 have a same set of non-colocations with components 1, 2, and 3.

Query placement partition generation can also include extracting resource equivalence groups from each of the non-colocation groups. A resource equivalence group can be defined as a set of components having identical resource requirements on all resource dimensions. In the example at hand, there exists only one such case—components 5 and 6 have the same resource requirements in all dimensions (e.g., the same processing, memory, and storage requirements), but these are different than the resource requirements of component 4 because it requires less memory (e.g., 2 GB instead of 4 GB). Accordingly, this results in extracting:
{components={4}, non-colocations={1,2,3}, type=1}
{components={5,6}, non-colocations={1,2,3}, type=1}
(from {components={4,5,6}, non-colocations={1,2,3}, type=1})

Accordingly, based upon combining data from the extracted colocation groups, non-colocation groups, and resource equivalence groups, the following query placement partition is generated with four groups, each group having a set of one or more component identifiers and zero or more non-colocation identifiers:
Group 1: {components={1,2}, non-colocations={3,4,5,6}, type=0}
Group 2: {components={3}, non-colocations={1,2,4,5,6}, type=1}
Group 3: {components={4}, non-colocations={1,2,3}, type=1}
Group 4: {components={5,6}, non-colocations={1,2,3}, type=1}

Figure 10:
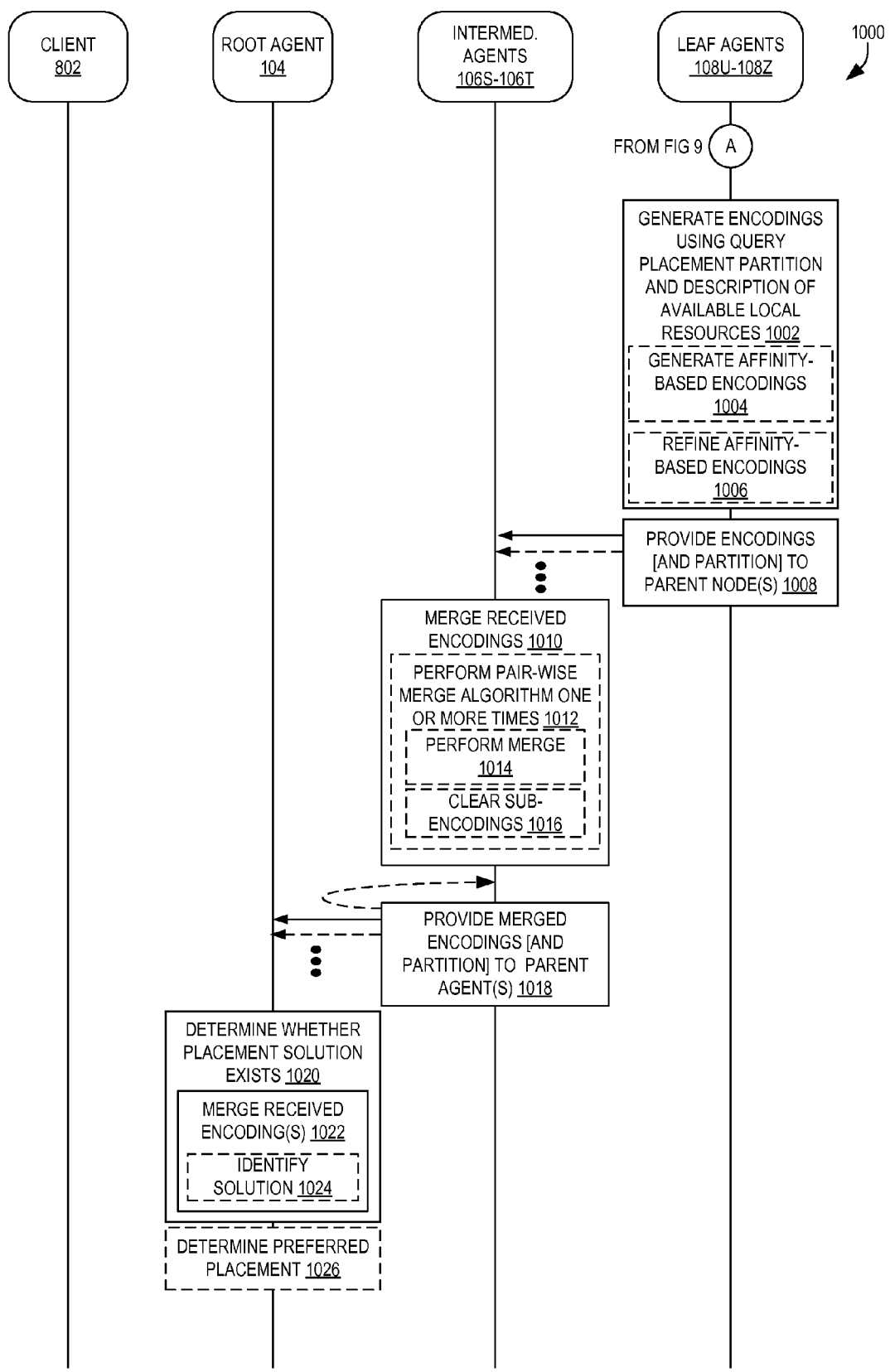
FIG. 10 is a combined sequence and flow diagram continuing the operations of FIG. 9 for generating service placement solution encodings according to some embodiments.

With the query placement partition, the overall flow can continue with encoding generation at block 1002 of FIG. 10, which is a combined sequence and flow diagram continuing the message flows and operations depicted in FIG. 9 for decentralized service placement according to some embodiments.

Once the query placement partition (or "pattern") is computed at a leaf agent (e.g., leaf agent 108U), a set of encodings is generated at block 1002 based on what can be placed by the resources (e.g., 104U) of one or more electronic devices (e.g., 110U, which can be server computing devices) associated with the leaf agent 108U, from a strictly "local" point of view (i.e., only in view of the "local" resources 114U of that set of electronic devices 110U, ignoring the resources (e.g., 104V-104Z) of all other electronic devices (110V-110Z) in the system). Thus, in some embodiments the query placement partition pattern will be common/identical across the data center, but the encodings generated based upon that pattern (and computed at each leaf agent) can be different, but nonetheless compatible.

As additional system variants, in some embodiments the root agent 104 may generate the query placement partition instead of the leaf agents and pass this to the leaf agents, and in some embodiments another entity (e.g., the client 802 or another system) generates the query placement partition and provides it to the root agent 104 to be distributed throughout the hierarchy to the leaf agents, which then can generate encodings based upon their individual views of their local resource availabilities and capabilities.

An example computation of possible encodings using the generated query placement partition occurring at a leaf agent that governs the resources of associated resources will now be provided In some embodiments, block 1002 (i.e., the generation of encodings using the query placement partition and description of available local resources) generates encodings using a pattern {W, X, Y, Z}. In this pattern, each letter denotes the number of elements that can be selected from the Groups 1, 2, 3, and 4, respectively, based upon a placement scenario.

For this example, we assume that each of the electronic devices in the data center has the same available resources 114U-Z: {8 Cores, 16 GB Memory, 4 TB Storage} available.

Each leaf agent can first generate 1004 the affinity-based encodings of {W, X, Y, Z} as follows:

Encoding 1—{2, 0, 0, 0}. Components from Group 1 mapping to W must always be placed together or not at all. When doing a placement from Group 1, no placements from the other groups can be done, as each and every one of the components in the remaining groups are in the non-colocation constraints of Group 1. Hence, the encoding of X, Y, Z as 0, 0, 0, which yields the total {2, 0, 0, 0}.

Encoding 2—{0, 1, 0, 0}: Assuming a placement of the one component of Group 2, we get a "1" for X. Next, because the component from Group 2 cannot be co-located with any of the other components from the other groups, W, Y, Z take value 0.

Encoding 3—{0, 0, 1, 2}: Components from Groups 3 and 4 cannot be co-located with components from the other groups, however, there are no restrictions on their joint placement. Thus, we generate a single encoding for all of these components of groups 3 and 4.

In some embodiments, encodings such as {0, 0, 1, 1} are not included in the resulting encodings. The reason is because {0, 0, 1, 1} is a sub-encoding of one or more of the set of three encodings given above. An encoding "e1" is a sub-encoding of another encoding "e2" if column-wise subtraction of e1 from e2 gives an encoding with all non-negative values. In this case for instance {0,0,1,1} is a sub-encoding of {0,0,1,2}, as column-wise (e2−e1) yields {0,0,0,1}, which includes all non-negative values. In these embodiments, such sub-encodings are not considered as uniquely representative of the solution set as they can be trivially derived from one of their super-encodings. An encoding is deemed uniquely representative of the solution space if it is not a sub-encoding of any of the other encodings of the solution space. Note that all three encodings given above are uniquely representative of the solution space, although they may be representing intersecting portions of the solution space. Two encodings are deemed unique from one another if their column-wise subtraction yields a mix of negative and non-negative numbers. It can be seen that this applies to all of the three encodings computed above.

In some embodiments, the affinity-based encodings are further refined at block 1006 to correctly represent the solution space in terms of what can be effectively placed with respect to total local resources available at the electronic devices associated with the agent. The process of refining is undertaken as follows:

The first affinity-based encoding {2,0,0,0} yields a total resource requirement of {4 Cores, 8 GB Memory, 2 TB Storage}, which can be supported given the available local resources of {8, 16, 4}. Hence {2,0,0,0} is a refined encoding already, and remains in the refined set of affinity based encodings 620.

The second affinity-based encoding {0,1,0,0} yields a total resource requirement of {1 Cores, 1 GB Memory, 1 TB Storage}, which can be supported given the available local resources of {8, 16, 4}. Similarly, {0,1,0,0} is a refined encoding already, and remains in the refined set of affinity based encodings 620.

The second affinity-based encoding {0,0,1,2} yields a total requirement of {3 Cores, 10 GB Memory, 6 TB Storage}, which cannot be satisfied by the available local resources (as the 4 TB of local storage does not satisfy the 6 TB of requested storage). Thus, two "subsets" of {0,0,1,2} can be found that can be satisfied are {0,0,1,1} and {0,0,0,2}. Note that these two subsets are uniquely representative with respect to one another. Also, an important note to make here is that, these subsets can be trivially calculated by bounding each part of the encoding with the maximum number of placements that can be made from a single group.

Once these upper bounds are computed, they provide an efficiently pruned solution space to search in. Hence, the uniquely representative sub-encodings of an affinity encoding can be computed very fast.

Accordingly, the refining process 1006 results in four encodings, namely {2,0,0,0}; {0,1,0,0}; {0,0,1,1}; and {0,0,0,2}. These encodings cover all possible placements of the service request description query on the set of associated electronic devices entirely based on their local available resources.

Note that in various embodiments, the definition of an "available" resource can be different and formulated in a variety of ways known to those of skill in the art. In some embodiments, an amount of available resource can be determined by subtracting an allocated/reserved amount of the resource from a total amount of resources made available for allocation. For example, a server computing device could have total storage of 10 TB, where 9 TB is made available for service placement, of which 6 TB may already be allocated. Thus, 3 TB of storage can be deemed as "available." Thus, in various embodiments, the refinement 1006 of the affinity-based encodings can be based upon knowledge (by the agent) of the available resources of its associated electronic device(s). There are a variety of ways of the agent acquiring this availability information, such as through reporting, polling, and/or on-demand request mechanisms known to those of skill in the art.

Once the refined encodings (and optionally, the pattern description) are computed at each leaf agent, they can be passed "upward" in the hierarchy at block 1008 to the parent agent that the service request description (or "query") was received from.

The recipient agent (e.g., 106S), upon receiving the set of encodings from each of the agents that it transmitted the query to, can compute a combined solution from the received encodings by merging the received encodings at block 1010. We now describe encoding merging performed at intermediate agents as part of decentralized service placement according to some embodiments.

For simplicity's sake (and without loss of generality), assume that all leaf agents 108U-108W (referred to herein as U, V, and W) return the exact same encodings to intermediate agent 106S. In some embodiments, the merging of the received encodings 1010 begins by combining the results from U & V in a "first pass" by performing column-wise addition with each pair of encodings, making sure that a column does not yield a number of components from a group that exceeds the total number of components in that group. For example, a first combination of {2,0,0,0} from U and {2,0,0,0} from V would result in U&V={2,0,0,0}—not {4,0,0,0}.

In some embodiments, these initial merged encodings can be reduced by clearing 1016A any existing sub-encodings. To reiterate, an encoding "e1" is a sub-encoding of another encoding "e2" if column-wise subtraction of e1 from e2 results in an encoding with all non-negative values. In this case, for instance, a first merged U&V encoding "e1" of {2,0,0,0} is a sub-encoding of at least a second encoding "e2" {2,1,0,0}, as column-wise (e2−e1) yields {0,1,0,0}, which includes all non-negative values. Thus, the first merged U&V encoding "e1" of {2,0,0,0} can be cleared or "pruned."

This result can then be merged with the received encodings from W in a second pass. Accordingly, this intermediate agent could generate four solution encodings indicating the possible placements that the electronic devices 110U-110W associated with its children leaf agents 108U-108W can provide: {2,1,1,1}, {2,1,0,2}, {2,0,1,2}, and {0,1,1,2}. Turning back to FIG. 10, these merged encodings (and possibly the generated partition) are provided back to the parent agent(s) of the intermediate agent.

Thus, in the example of FIG. 10, the merged encodings are passed back to the root agent 104. We also assume that identical encodings are received from both intermediate agent 106S and also intermediate agent 106T, because they have the same resources per our earlier stipulation. Note, however, that in many embodiments the receipt of identical encodings from all child agents may be not be a common case.

At the root agent 104, the process can continue with block 1020 for determining whether a placement solution exists for the service request 820. This block 1020 can include a (at least partial or complete) merging of received encodings at block 1022. During this process—even perhaps before the completion of all the merging—a solution may be identified at block 1024. However, in some cases, it is possible that no solution can be found, and thus, the system is unable to place the service request.

For an example of block 1020, we assume that the following encodings are received from both intermediate agent 106S and intermediate agent 106T: {(2,1,1,1); (2,1,0,2); (2,0,1,2); (0,1,1,2)}. Thus, the two encoding sets for S and T can begin to be merged. Accordingly, the first encoding from S {2,1,1,1} and the first encodings for T {2,1,1,1} can be merged to yield {2,1,1,2}. In this case, this merged encoding can be deemed to be a first solution due to a solution identification process. For example, as each merge occurs (or after all merges occur), the combined S&T encodings can be tested against the total requirements of the service request (e.g., from the query placement partition): group 1 has 2 components, group 2 has 1 component, group 3 has 1 component, and group 4 has 2 components. As this total requirement {2,1,1,2} is identical to the first merged encoding, a solution can be determined to exist. In contrast, if none of the merged encodings were identical to the total requirement, then no such solution exists. Note, in some embodiments, no clearing of sub-encodings from S&T needs to be performed, though in some non-illustrated embodiments they are cleared.

Returning to FIG. 10, from this point on it is just a matter of determining a preferred placement at block 1026, which can occur using the network-aware service placement techniques described above.

Various embodiments disclosed herein involve the use of electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 11A:
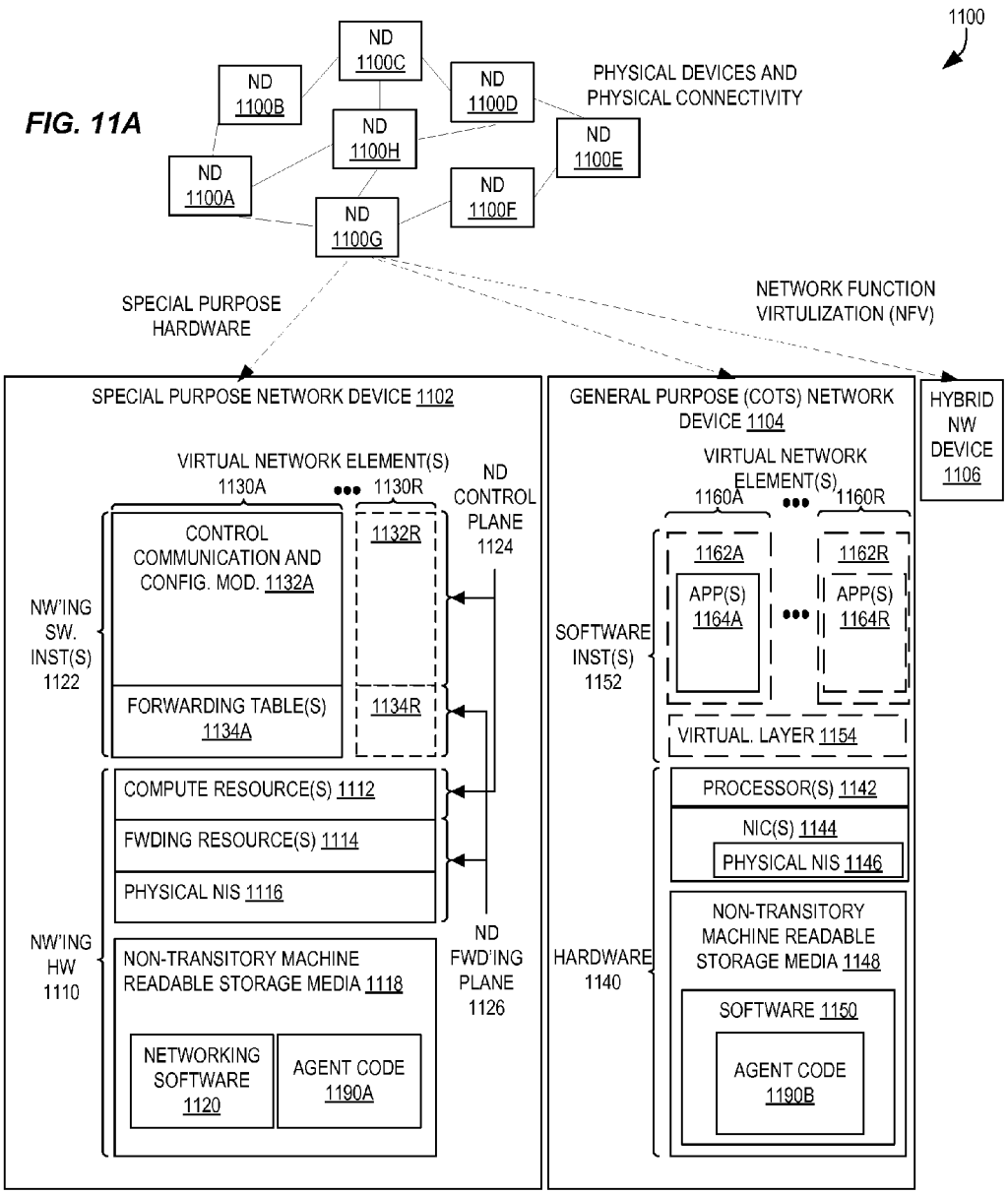
FIG. 11A illustrates connectivity between network devices (NDs) within an exemplary network, as well as three exemplary implementations of the NDs, according to some embodiments.

FIG. 11A illustrates connectivity between network devices (NDs) within an exemplary network, as well as three exemplary implementations of the NDs, according to some embodiments of the invention. FIG. 11A shows NDs 1100A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 1100A, E, and F illustrates that these NDs act as ingress and egress points for the network (and thus, these NDs are sometimes referred to as edge NDs; while the other NDs may be called core NDs).

Two of the exemplary ND implementations in FIG. 11A are: 1) a special-purpose network device 1102 that uses custom application-specific integrated-circuits (ASICs) and a proprietary operating system (OS); and 2) a general purpose network device 1104 that uses common off-the-shelf (COTS) processors and a standard OS.

The special-purpose network device 1102 includes networking hardware 1110 comprising compute resource(s) 1112 (which typically include a set of one or more processors), forwarding resource(s) 1114 (which typically include one or more ASICs and/or network processors), and physical network interfaces (NIs) 1116 (sometimes called physical ports), as well as non-transitory machine readable storage media 1118 having stored therein networking software 1120. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 1100A-H. During operation, the networking software 1120 may be executed by the networking hardware 1110 to instantiate a set of one or more networking software instance(s) 1122. Each of the networking software instance(s) 1122, and that part of the networking hardware 1110 that executes that network software instance (be it hardware dedicated to that networking software instance and/or time slices of hardware temporally shared by that networking software instance with others of the networking software instance(s) 1122), form a separate virtual network element 1130A-R. Each of the virtual network element(s) (VNEs) 1130A-R includes a control communication and configuration module 1132A-R (sometimes referred to as a local control module or control communication module) and forwarding table(s) 1134A-R, such that a given virtual network element (e.g., 1130A) includes the control communication and configuration module (e.g., 1132A), a set of one or more forwarding table(s) (e.g., 1134A), and that portion of the networking hardware 1110 that executes the virtual network element (e.g., 1130A).

Agent code 1190A can include code which when executed by networking hardware 1110, causes networking hardware 1110 to implement any of the agents disclosed herein and to perform operations of one or more embodiments of the present invention as part of networking software instances 1122.

The special-purpose network device 1102 is often physically and/or logically considered to include: 1) a ND control plane 1124 (sometimes referred to as a control plane) comprising the compute resource(s) 1112 that execute the control communication and configuration module(s) 1132A-R; and 2) a ND forwarding plane 1126 (sometimes referred to as a forwarding plane, a data plane, or a media plane) comprising the forwarding resource(s) 1114 that utilize the forwarding table(s) 1134A-R and the physical NIs 1116. By way of example, where the ND is a router (or is implementing routing functionality), the ND control plane 1124 (the compute resource(s) 1112 executing the control communication and configuration module(s) 1132A-R) is typically responsible for participating in controlling how data (e.g., packets) is to be routed (e.g., the next hop for the data and the outgoing physical NI for that data) and storing that routing information in the forwarding table(s) 1134A-R, and the ND forwarding plane 1126 is responsible for receiving that data on the physical NIs 1116 and forwarding that data out the appropriate ones of the physical NIs 1116 based on the forwarding table(s) 1134A-R.

Figure 11B:
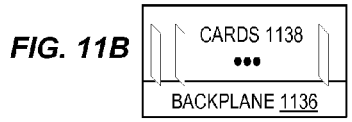
FIG. 11B illustrates an exemplary way to implement a special-purpose network device according to some embodiments.

FIG. 11B illustrates an exemplary way to implement the special-purpose network device 1102 according to some embodiments of the invention. FIG. 11B shows a special-purpose network device including cards 1138 (typically hot pluggable). While in some embodiments the cards 1138 are of two types (one or more that operate as the ND forwarding plane 1126 (sometimes called line cards), and one or more that operate to implement the ND control plane 1124 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1136 (e.g., a first full mesh coupling the line cards and a second full mesh coupling all of the cards).

Returning to FIG. 11A, the general purpose network device 1104 includes hardware 1140 comprising a set of one or more processor(s) 1142 (which are often COTS processors) and network interface controller(s) 1144 (NICs; also known as network interface cards) (which include physical NIs 1146), as well as non-transitory machine readable storage media 1148 having stored therein software 1150. During operation, the processor(s) 1142 execute the software 1150 to instantiate one or more sets of one or more applications 1164A-R. This can include executing agent code 1190A to implement any of the agents (as one or more of the one or more applications 1164A-R) described herein with regard to the various disclosed embodiments using one or more processor(s) 1142.

While one embodiment does not implement virtualization, alternative embodiments may use different forms of virtualization—represented by a virtualization layer 1154 and software containers 1162A-R. For example, one such alternative embodiment implements operating system-level virtualization, in which case the virtualization layer 1154 represents the kernel of an operating system (or a shim executing on a base operating system) that allows for the creation of multiple software containers 1162A-R that may each be used to execute one of the sets of applications 1164A-R. In this embodiment, the multiple software containers 1162A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 1154 represents a hypervisor (sometimes referred to as a virtual machine monitor (VMM)) or a hypervisor executing on top of a host operating system; and 2) the software containers 1162A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 1164A-R, as well as the virtualization layer 1154 and software containers 1162A-R if implemented, are collectively referred to as software instance(s) 1152. Each set of applications 1164A-R, corresponding software container 1162A-R if implemented, and that part of the hardware 1140 that executes them (be it hardware dedicated to that execution and/or time slices of hardware temporally shared by software containers 1162A-R), forms a separate virtual network element(s) 1160A-R.

The virtual network element(s) 1160A-R perform similar functionality to the virtual network element(s) 1130A-R—e.g., similar to the control communication and configuration module(s) 1132A and forwarding table(s) 1134A (this virtualization of the hardware 1140 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments may implement one or more of the software container(s) 1162A-R differently. For example, while some embodiments are illustrated with each software container 1162A-R corresponding to one VNE 1160A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 1162A-R to VNEs also apply to embodiments where such a finer level of granularity is used.

In certain embodiments, the virtualization layer 1154 includes a virtual switch that provides similar forwarding services as a physical Ethernet switch. Specifically, this virtual switch forwards traffic between software containers 1162A-R and the NIC(s) 1144, as well as optionally between the software containers 1162A-R; in addition, this virtual switch may enforce network isolation between the VNEs 1160A-R that by policy are not permitted to communicate with each other (e.g., by honoring virtual local area networks (VLANs)).

Software 1150 can include agent code 1190B which when executed by processor(s) 1142, causes processor(s) 1142 to perform operations of one or more embodiments of the present invention as part of software containers 1162A-R.

The third exemplary ND implementation in FIG. 11A is a hybrid network device 1106, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 1102) could provide for para-virtualization to the networking hardware present in the hybrid network device 1106.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 1130A-R, VNEs 1160A-R, and those in the hybrid network device 1106) receives data on the physical NIs (e.g., 1116, 1146) and forwards that data out the appropriate ones of the physical NIs (e.g., 1116, 1146). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

The NDs of FIG. 11A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email or social services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 11A may also host one or more such servers (e.g., in the case of the general purpose network device 1104, one or more of the software containers 1162A-R may operate as servers; the same would be true for the hybrid network device 1106; in the case of the special-purpose network device 1102, one or more such servers could also be run on a virtualization layer executed by the compute resource(s) 1112); in which case the servers are said to be co-located with the VNEs of that ND.

Figure 12:
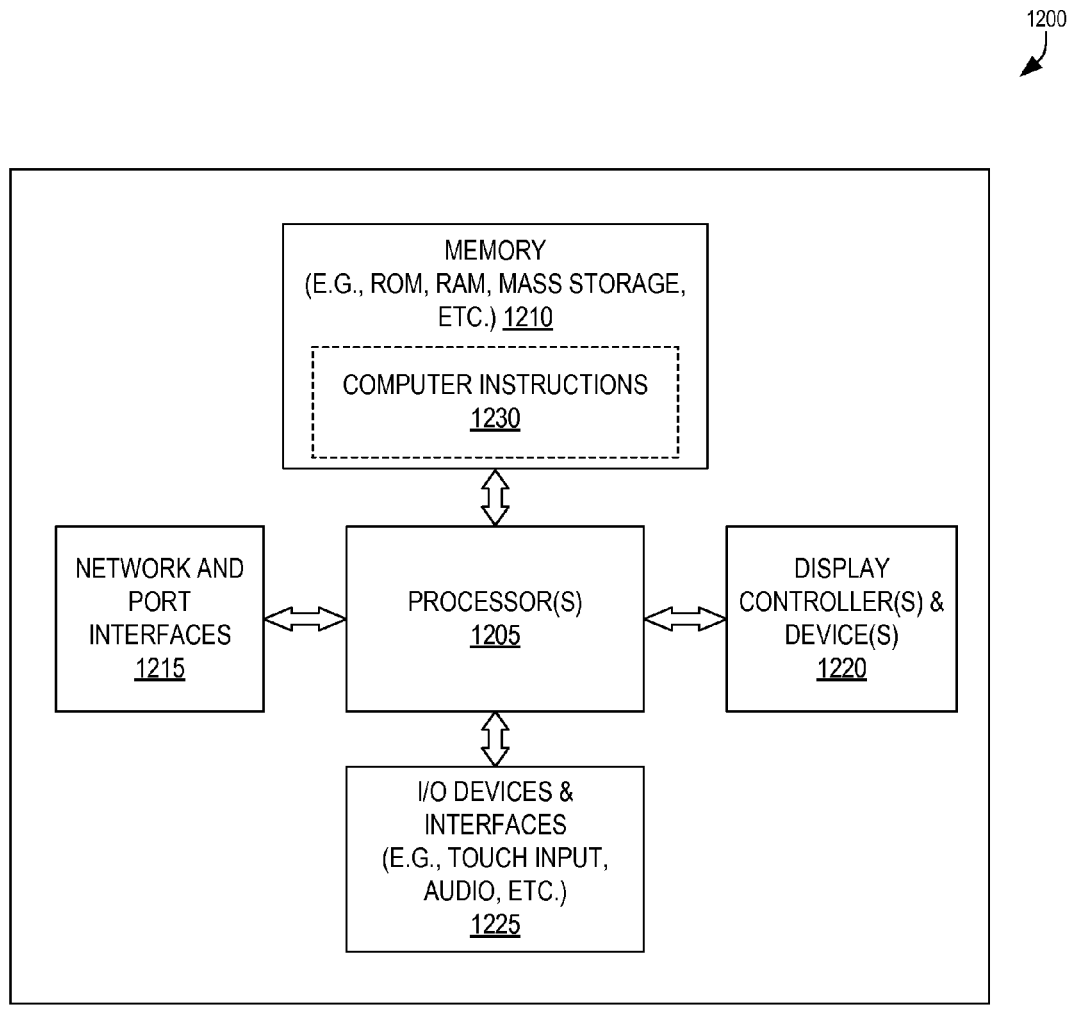
FIG. 12 is a block diagram illustrating an exemplary data processing system that may be used in some embodiments.

FIG. 12 illustrates a block diagram for an exemplary data processing system 1200 that may be used in some embodiments. Data processing system 1200 includes one or more microprocessors 1205 and connected system components (e.g., multiple connected chips). Alternatively, the data processing system 1200 is a system on a chip. One or more such data processing systems 1200 may be utilized to implement the functionality of the agents, modules, server end stations, hosts, or other devices as illustrated above in FIGS. 1-11.

The data processing system 1200 includes memory 1210, which is coupled to the microprocessor(s) 1205. The memory 1210 may be used for storing data, metadata, and programs for execution by the microprocessor(s) 1205. For example, the depicted memory 1210 may store computer instructions 1230 that, when executed by the microprocessor(s) 1205, causes the data processing system 1200 to perform the operations described herein. The memory 1210 may include one or more of volatile and non-volatile memories, such as Random Access Memory ("RAM"), Read Only Memory ("ROM"), a solid state disk ("SSD"), Flash, Phase Change Memory ("PCM"), magnetic storage, or other types of data storage. The memory 1210 may be internal or distributed memory. In some embodiments, a portion or all of the computer instructions 1230 are stored on an external cloud device.

The data processing system 1200 may also include a display controller and display device 1220 that provides a visual user interface for the user, e.g., GUI elements or windows. The display device 1220 may also display various media content to the user. The data processing system 1200 also includes one or more input or output ("I/O") devices and interfaces 1225, which are provided to allow a user to provide input to, receive output from, and otherwise transfer data to and from the system. These I/O devices 1225 may include a mouse, keypad, keyboard, a touch panel or a multi-touch input panel, camera, optical scanner, network interface, modem, other known I/O devices or a combination of such I/O devices. The touch input panel may be a single touch input panel which is activated with a stylus or a finger or a multi-touch input panel which is activated by one finger or a stylus or multiple fingers, and the panel is capable of distinguishing between one or two or three or more touches and is capable of providing inputs derived from those touches to the processing system 1200. The I/O devices and interfaces 1225 may also include a connector for a dock or a connector for a USB interface, FireWire, Thunderbolt, Ethernet, etc., to connect the system 1200 with another device, external component, or a network. Exemplary I/O devices and interfaces 1225 also include wireless transceivers, such as an Institute of Electrical and Electronics Engineers (IEEE) 802.11 transceiver, an infrared transceiver, a Bluetooth transceiver, a wireless cellular telephony transceiver (e.g., 2G, 3G, 4G, 5G), or another wireless protocol to connect the data processing system 1200 with another device, external component, or a network and receive stored instructions, data, tokens, etc. In some embodiments, these various components will be provided as a system on a chip (SoC). It will be appreciated that one or more buses may be used to interconnect the various components shown in FIG. 12.

For example, the data processing system 1200 may be a personal computer (PC), tablet-style device, a personal digital assistant (PDA), a cellular telephone (e.g., smartphone), a Wi-Fi based telephone, a handheld computer which may optionally include a cellular telephone, a media player, an entertainment system, a handheld gaming system, a wearable computing device (e.g., smartwatch, digital eyewear), or devices which combine aspects or functions of these devices, such as a media player combined with a PDA and a cellular telephone in one device. In other embodiments, the data processing system 1200 may be a network computer, server, network device, router, or an embedded processing device within another device or consumer electronic product. As used herein, the terms computer, system, device, processing device, and "apparatus comprising a processing device" may be used interchangeably with the term data processing system 1200 and include the above-listed exemplary embodiments.

It will be appreciated that additional components, not shown, may also be part of the system 1200, and, in some embodiments, fewer components than that shown in FIG. 12 may also be used in a data processing system 1200. For example, in some embodiments where the data processing system 1200 is a router, the router may have one or more control cards configure routing in the network and one or more line cards to switch packets in a network based on the routing configuration from the control cards.

It will be apparent from this description that aspects of the inventions may be embodied, at least in part, in software. That is, the computer-implemented methods may be carried out in a computer system or other data processing system in response to its processor or processing system executing sequences of instructions contained in a memory, such as memory 1210 or other non-transitory machine-readable storage medium. The software may further be transmitted or received over a network (not shown) via a network and/or port interface 1215. In various embodiments, hardwired circuitry may be used in combination with the software instructions to implement the present embodiments. Thus, the techniques are not limited to any specific combination of hardware circuitry and software, or to any particular source for the instructions executed by the data processing system 1200.

Alternative Embodiments

The operations in the flow diagrams have been described with reference to the exemplary embodiments of the other diagrams. However, it should be understood that the operations of the flow diagrams can be performed by embodiments other than those discussed with reference to these other diagrams, and the embodiments discussed with reference these other diagrams can perform operations different than those discussed with reference to the flow diagrams.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, various embodiments are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a root agent for network-aware decentralized service placement, wherein the root agent executes at an electronic device and acts as a parent to a plurality of intermediate agents in a hierarchy of agents, wherein each of the plurality of intermediate agents acts as a parent to one or more descendant agents associated with one or more electronic devices having resources available for service placement, the method comprising:

receiving, at the root agent, a plurality of sets of solution encodings corresponding to the plurality of intermediate agents, wherein each of the plurality of sets of solution encodings indicates possible placements of some or all of a plurality of components of an application that the one or more electronic devices associated with the one or more descendant agents of the intermediate agent can locally provide while satisfying requirements of the some or all of the components;

generating, by the root agent based upon the plurality of sets of solution encodings, one or more cover sets indicating feasible placement solutions that can successfully satisfy the requirements of all of the components of the application;

partitioning, by the root agent for each of the one or more cover sets, the components of the application into a plurality of assignment sets corresponding to the plurality of intermediate agents while adhering to the feasible placement solutions of the cover set to indicate placements of the plurality of components that minimize network traffic travelling between electronic devices associated with the plurality of intermediate agents that would result from the placements, to yield one or more candidate placement solutions; and transmitting, by the root agent to a first intermediate agent of the plurality of intermediate agents, a service placement solution indicating one or more of the plurality of components that are to be placed by the first intermediate agent according to a selected one of the one or more candidate placement solutions.

2. The method of claim 1, further comprising:
prior to the receiving of the plurality of sets of solution encodings, transmitting a service request description to each of the plurality of intermediate agents, wherein the service request description specifies the requirements for the plurality of components,
wherein the plurality of sets of solution encodings are received from the plurality of intermediate agents.

3. The method of claim 1, wherein the partitioning includes:
generating, by the root agent, an application graph including a plurality of vertices corresponding to the plurality of components of the application and a plurality of edges connecting pairs of the plurality of vertices, wherein each of the plurality of edges is associated with a data transfer amount expected to be transmitted between the pair of components connected by the edge.

4. The method of claim 3, wherein the partitioning further includes:
generating a sorted list of edges including all of the plurality of edges that is sorted according to the data transfer amounts of the plurality of edges.

5. The method of claim 4, wherein the partitioning further includes:
for each of the one or more cover sets,
when one or more of the plurality of components are determined to have an inflexible placement location based upon the cover set, placing the one or more components into the plurality of assignment sets based upon the inflexible placement locations, and
iteratively processing one or more edges of the sorted list of edges to assign one or more of the plurality of components to the assignment sets until all of the sorted list of edges have been processed or until all of the components have been placed into the plurality of assignment sets.

6. The method of claim 1, wherein the one or more candidate placement solutions comprise a plurality of candidate placement solutions, and wherein the method further comprises:

determining a plurality of cost values corresponding to the plurality of candidate placement solutions, wherein each of the plurality of cost values is determined based upon an anticipated amount of network traffic resulting between the electronic devices associated with the plurality of intermediate agents that would result from the corresponding candidate placement solution being selected; and determining the selected one of the plurality of candidate placement solutions based upon the determined plurality of cost values.

7. A method in an intermediate agent for network-aware decentralized service placement, wherein the intermediate agent executes at an electronic device and acts as a parent to a plurality of leaf agents in a hierarchy of agents and further acts as a child to another agent in the hierarchy, the method comprising:

receiving, at the intermediate agent from the another agent, a service placement solution indicating one or more of a plurality of components of an application that are to be placed by one or more electronic devices associated with the plurality of leaf agents that have resources available for service placement;

generating, by the intermediate agent based upon the received service placement solution and further based upon a plurality of solution encodings indicating possible placements of some or all of the plurality of components that the one or more electronic devices can provide while satisfying requirements of the some or all of the plurality of components, one or more cover sets indicating feasible placement solutions that can successfully satisfy the requirements of the one or more components;

partitioning, by the intermediate agent for each of the one or more cover sets, the one or more components of the application into a plurality of assignment sets corresponding to the plurality of leaf agents while adhering to the feasible placement solutions of the cover set to indicate placements of the one or more components that minimize network traffic between the one or more electronic devices associated with the plurality of agents that would result from the placements to yield one or more candidate placement solutions; and transmitting, by the intermediate agent to a first leaf agent of the plurality of leaf agents, a service placement solution indicating one or more of the one or more components that is to be placed by the electronic device associated with the first leaf agent according to a selected one of the one or more candidate placement solutions.

8. The method of claim 7, wherein the another agent comprises a root agent in the hierarchy.

9. The method of claim 7, wherein the another agent comprises another intermediate agent in the hierarchy.

10. The method of claim 7, wherein the requirements include at least one affinity or location constraint associated with one or more of the plurality of components.

11. The method of claim 7, wherein:
the one or more components includes a plurality of components; and
the partitioning includes generating an application graph including a plurality of vertices corresponding to the plurality of components and a plurality of edges connecting pairs of the plurality of vertices, wherein each of the plurality of edges is associated with a data transfer amount expected to be transmitted between the pair of components connected by the edge.

12. The method of claim 11, wherein the partitioning further includes:
  generating a sorted list of edges including all of the plurality of edges, wherein the sorted list of edges is sorted according to the data transfer amounts of the plurality of edges.

13. The method of claim 12, wherein the partitioning further includes:
  for each of the one or more cover sets,
    when one or more of the plurality of components are determined to have an inflexible placement location based upon the cover set, placing the one or more components into the plurality of assignment sets based upon the inflexible placement locations, and
    iteratively processing one or more edges of the sorted list of edges to assign one or more of the plurality of components to the assignment sets until all of the sorted list of edges have been processed or until all of the components have been placed into the plurality of assignment sets.

14. The method of claim 7, wherein the one or more candidate placement solutions comprise a plurality of candidate placement solutions, and wherein the method further comprises:
  determining a plurality of cost values corresponding to the plurality of candidate placement solutions, wherein each of the plurality of cost values is determined based upon an anticipated amount of network traffic resulting between the plurality of intermediate agents that would occur from the corresponding candidate placement solution being selected; and
  determining the selected one of the plurality of candidate placement solutions based upon the determined plurality of cost values.

15. A non-transitory computer-readable storage medium having instructions which, when executed by one or more processors of an electronic device, cause the electronic device to implement a root agent act as a parent to plurality of intermediate agents in a hierarchy of agents, wherein each of the plurality of intermediate agents acts as a parent to one or more descendant agents associated with one or more electronic devices having resources available for service placement, wherein the root agent is to perform network-aware decentralized service placement by performing operations comprising:
  receiving a plurality of sets of solution encodings corresponding to the plurality of intermediate agents, wherein each of the plurality of sets of solution encodings indicates possible placements of some or all of a plurality of components of an application that the one or more electronic devices associated with the one or more descendant agents of the intermediate agent can locally provide while satisfying requirements of the some or all of the components;
  generating, based upon the plurality of sets of solution encodings, one or more cover sets indicating feasible placement solutions that can successfully satisfy the requirements of all of the components of the application;
  partitioning, for each of the one or more cover sets, the components of the application into a plurality of assignment sets corresponding to the plurality of intermediate agents while adhering to the feasible placement solutions of the cover set to indicate placements of the plurality of components that minimize network traffic travelling between the electronic devices associated with the plurality of intermediate agents that would result from the placements, to yield one or more candidate placement solutions; and
  transmitting, to a first intermediate agent of the plurality of intermediate agents, a service placement solution indicating one or more of the plurality of components that are to be placed by the first intermediate agent according to a selected one of the one or more candidate placement solutions.

16. The non-transitory computer-readable storage medium of claim 15, wherein the partitioning includes:
  generating an application graph including a plurality of vertices corresponding to the plurality of components of the application and a plurality of edges connecting pairs of the plurality of vertices, wherein each of the plurality of edges is associated with a data transfer amount expected to be transmitted between the pair of components connected by the edge.

17. The non-transitory computer-readable storage medium of claim 16, wherein the partitioning further includes:
  generating a sorted list of edges including all of the plurality of edges that is sorted according to the data transfer amounts of the plurality of edges; and
  for each of the one or more cover sets,
    when one or more of the plurality of components are determined to have an inflexible placement location based upon the cover set, placing the one or more components into the plurality of assignment sets based upon the inflexible placement locations, and
    iteratively processing one or more edges of the sorted list of edges to assign one or more of the plurality of components to the assignment sets until all of the sorted list of edges have been processed or until all of the components have been placed into the plurality of assignment sets.

18. A non-transitory computer-readable storage medium having instructions which, when executed by one or more processors of an electronic device, cause the electronic device to implement an intermediate agent to act as a parent to a plurality of leaf agents in a hierarchy and further to act as a child to another agent in the hierarchy to perform network-aware decentralized service placement by performing operations comprising:
  receiving, from the another agent, a service placement solution indicating one or more of a plurality of components of an application that are to be placed by one or more electronic devices associated with the plurality of leaf agents that have resources available for service placement;
  generating, based upon the received service placement solution and further based upon a plurality of solution encodings indicating possible placements of some or all of the plurality of components that the one or more electronic devices can provide while satisfying requirements of the some or all of the plurality of components, one or more cover sets indicating feasible placement solutions that can successfully satisfy the requirements of the one or more components;
  partitioning, for each of the one or more cover sets, the one or more components of the application into a plurality of assignment sets corresponding to the plurality of leaf agents while adhering to the feasible placement solutions of the cover set to indicate placements of the one or more components that minimize network traffic between the one or more electronic devices associated with the plurality of agents that would result from the placements to yield one or more candidate placement solutions; and transmitting, to a first leaf agent of the plurality of leaf agents, a service placement solution indicating one or more of the one or more components that is to be placed by the electronic device associated with the first leaf agent according to a selected one of the one or more candidate placement solutions.

19. The non-transitory computer-readable storage medium of claim 18, wherein:

the one or more components includes a plurality of components; and the partitioning includes generating an application graph including a plurality of vertices corresponding to the plurality of components and a plurality of edges connecting pairs of the plurality of vertices, wherein each of the plurality of edges is associated with a data transfer amount expected to be transmitted between the pair of components connected by the edge.

20. The non-transitory computer-readable storage medium of claim 19, wherein the partitioning further includes:

generating a sorted list of edges including all of the plurality of edges, wherein the sorted list of edges is sorted according to the data transfer amounts of the plurality of edges; and for each of the one or more cover sets, when one or more of the plurality of components are determined to have an inflexible placement location based upon the cover set, placing the one or more components into the plurality of assignment sets based upon the inflexible placement locations, and iteratively processing one or more edges of the sorted list of edges to assign one or more of the plurality of components to the assignment sets until all of the sorted list of edges have been processed or until all of the components have been placed into the plurality of assignment sets.

* * * * *